(12) United States Patent
Werner et al.

(10) Patent No.: US 12,019,140 B2
(45) Date of Patent: Jun. 25, 2024

(54) TECHNIQUES FOR IMPROVING RANGING BETWEEN ELECTRONIC DEVICES

(71) Applicant: Apple Inc., Cupertino, CA (US)

(72) Inventors: Benjamin Werner, San Jose, CA (US); Merrick McCracken, Sunnyvale, CA (US); Robert Brumley, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 132 days.

(21) Appl. No.: 17/805,425

(22) Filed: Jun. 3, 2022

(65) Prior Publication Data

US 2022/0299621 A1    Sep. 22, 2022

Related U.S. Application Data

(63) Continuation of application No. 17/169,025, filed on Feb. 5, 2021, now Pat. No. 11,378,672.

(60) Provisional application No. 63/083,754, filed on Sep. 25, 2020.

(51) Int. Cl.
*G01S 13/46* (2006.01)
*G01S 5/02* (2010.01)
*G01S 5/10* (2006.01)
*H04W 64/00* (2009.01)

(52) U.S. Cl.
CPC ............ *G01S 13/46* (2013.01); *G01S 5/0252* (2013.01); *G01S 5/0289* (2013.01); *G01S 5/10* (2013.01); *H04W 64/006* (2013.01); *G01S 5/0218* (2020.05); *G01S 2013/468* (2013.01)

(58) Field of Classification Search
CPC ...... G01S 13/46; G01S 5/0252; G01S 5/0289; G01S 5/10; G01S 5/0218; G01S 2013/468; G01S 13/765; H04W 64/006; H04W 56/0035

USPC ................. 455/13.2, 404.2, 456.1–457, 502, 455/504–506, 208, 265

See application file for complete search history.

(56) References Cited

U.S. PATENT DOCUMENTS

| | | | | |
|---|---|---|---|---|
| 2005/0058081 | A1* | 3/2005 | Elliott | G01S 13/825 370/252 |
| 2018/0242270 | A1* | 8/2018 | Zhang | G01S 11/02 |
| 2019/0306825 | A1* | 10/2019 | Lindskog | H04W 24/10 |

OTHER PUBLICATIONS

Notice of Allowance issued in U.S. Appl. No. 17/169,025, dated Mar. 4, 2022 in 10 pages (of-record in parent application).

* cited by examiner

*Primary Examiner* — Michael Y Mapa
(74) *Attorney, Agent, or Firm* — Kilpatrick Townsend & Stockton LLP

(57) ABSTRACT

A mobile device may receive a plurality of timestamps, wherein the plurality of timestamps indicate sending and receiving time for ranging packets and response packets. The mobile device may calculate a responder turn-around time as a first difference between the second time and the first time. The mobile device may calculate a responding round trip time as a second difference between the second time and the third time. The mobile device may receive from the electronic device an initiator turn-around time and an initiator round trip time. The mobile device may calculate a frequency offset for the wireless protocol using the responder turn-around time, the responding round trip time, the initiator turn-around time, and the initiator round trip time. The mobile device may compare an observed frequency offset to the calculated frequency offset to determine a frequency offset difference and whether it exceeds a threshold, adjusting a ranging measurement.

20 Claims, 12 Drawing Sheets

TECHNIQUES FOR IMPROVING RANGING BETWEEN ELECTRONIC DEVICES

CROSS-REFERENCES TO RELATED APPLICATIONS

This application is a Continuation of U.S. application Ser. No. 17/169,025 entitled "Techniques For Improving Ranging Between Electronic Devices," filed on Feb. 5, 2021, which claims priority to U.S. Provisional Patent Application No. 63/083,754, entitled "Techniques For Improving Ranging Between Electronic Devices," filed Sep. 25, 2020, hereby incorporated by reference in its entirety and for all purposes.

BACKGROUND

Ranging techniques between electronic devices can be inaccurate because of lack of synchronization between the internal clocks of the electronic devices, an inaccuracy of the timing of the internal clocks (e.g., due to heat), and Doppler shift of the pulses due to motion of the electronic devices. In addition, multipath propagation of ranging signals can produce inaccurate ranging results. Techniques for determining range or angular relationship between electronic devices using one-to-one communications is inefficient. These techniques are complicated because the internal clocks of various electronic devices are not synchronized with each other.

Further, regulatory restrictions limit the amount of power that can be transmitted by electronic devices in defined frequency bands. With limited power, it can be difficult to identify the time and frequency of ranging responses above the background noise levels.

Lost or misplaced devices can result in wasted time and possible additional expense. GPS location systems may not be precise enough to locate devices at close ranges. Device owners can use both range and angular information to assist them in locating the lost or misplaced devices quickly with minimal effort.

BRIEF SUMMARY

Certain embodiments are directed to techniques (e.g., a device, a method, a memory or non-transitory computer readable medium storing code or instructions executable by one or more processors) for enhanced ranging techniques to improve ranging techniques between electronic devices. Techniques to improve ranging between electronic devices (e.g., a mobile device and an electronic tag) can include using a three packet exchange between the electronic devices. Techniques can include exchanging the parameters (e.g., proposed transmission times) for a ranging session between an electronic device and a mobile device via a first wireless protocol (e.g., Bluetooth Low Energy). The three-packet exchange can measure various parameters of the exchange including the Round Trip Time (initiator), the Turn Around Time (responder), the Round Trip Time (responder), and Turn Around Time (responder). These measured parameters can be used to calculate a frequency offset ($\Delta$) from the observed frequency of the ranging frequency using a second wireless frequency (e.g., ultra-wideband (UWB)). If the computed versus the observed frequency is not similar, it can be because the responding device has received interference due to multipath propagation on one or two of the transmissions. If responses are identified as multipath, the responses (and corresponding ranges) can be discarded, or weighted to minimize value, or not displayed (a previous range value may continue to be displayed).

Other techniques can include antenna diversity to reduce the influence of multipath signals by using two different sets of antennas to form ranges. In this way, depending on the orientation of the responding device with respect to the initiating device, the antenna array with the better perspective can be used, which can eliminate potential multipath signals that can result in inaccurate range results. For example, if the antenna array is facing away from the initiating device, it is more likely to receive multipath signals than the antenna array facing the initiating device.

Additional techniques include a headerless/dataless mode. The electronic devices can exchange preamble and secure timing sequence (STS) information via Bluetooth protocol. In this way, the UWB pulse information can be easier to locate above the background noise.

The ranging functionality can be implemented in combination with another wireless protocol, which can establish an initial communication session, e.g., to perform authentication and/or exchange ranging settings. Additional wireless protocols can also be used, e.g., for transmission of content from one device to the other.

According to some implementations, a method may include receiving a plurality of timestamps, wherein the plurality of timestamps indicate receiving a first ranging packet at a first time, sending a response packet at a second time, and receiving a second ranging packet at a third time; calculating a responder turn-around time as a first difference between the second time and the first time; calculating a responding round trip time as a second difference between the second time and the third time; receiving from the electronic device an initiator turn-around time and an initiator round trip time; calculating a frequency offset between the wireless protocol from the mobile device and the wireless protocol of the electronic device using the responder turn-around time, the responding round trip time, the initiator turn-around time, and the initiator round trip time; comparing an observed frequency offset to the calculated frequency offset to determine a frequency offset difference; and when the frequency offset difference exceeds a threshold, adjusting a ranging measurement.

According to some implementations, a mobile device may include one or more memories; and one or more processors, communicatively coupled to the one or more memories, configured to instructions to perform operations to: receive a plurality of timestamps, wherein the plurality of timestamps indicate receiving a first ranging packet at a first time, sending a response packet at a second time, and receiving a second ranging packet at a third time; calculate a responder turn-around time as a first difference between the second time and the first time; calculate a responding round trip time as a second difference between the second time and the third time; receive from the electronic device an initiator turn-around time and an initiator round trip time; calculate a frequency offset between the wireless protocol from the mobile device and the wireless protocol of the electronic device using the responder turn-around time, the responding round trip time, the initiator turn-around time, and the initiator round trip time; compare an observed frequency offset to the calculated frequency offset to determine a frequency offset difference; and when the frequency offset difference exceeds a threshold, adjust a ranging measurement.

According to some implementations, a non-transitory computer-readable medium may store one or more instructions. The one or more instructions, when executed by one or more processors of a mobile device, may cause the one or more processors to perform operations to: receive a plurality of timestamps, wherein the plurality of timestamps indicate receiving a first ranging packet at a first time, sending a response packet at a second time, and receiving a second ranging packet at a third time; calculate a responder turn-around time as a first difference between the second time and the first time; calculate a responding round trip time as a second difference between the second time and the third time; receive from the electronic device an initiator turn-around time and an initiator round trip time; calculate a frequency offset between the wireless protocol from the mobile device and the wireless protocol of the electronic device using the responder turn-around time, the responding round trip time, the initiator turn-around time, and the initiator round trip time; compare an observed frequency offset to the calculated frequency offset to determine a frequency offset difference; and when the frequency offset difference exceeds a threshold, adjust a ranging measurement.

According to some implementations, a method may include receiving a first set of ranging packets at a first antenna array in a first location on the mobile device; calculating a first ranging value based at least in part on the first set of ranging packets; receiving a second set of ranging packets at a second antenna array in a second location on the mobile device, where the second location is different from the first location; calculating a second ranging value based at least in part on the second set of ranging packets; comparing the first ranging value and the second ranging value to determine a difference; comparing the difference to a threshold; and when the difference is above a threshold, adjusting at least one of the first ranging value and the second ranging value.

According to some implementations, a mobile device may include one or more memories; and one or more processors, communicatively coupled to the one or more memories, configured to store instructions to perform operations to: receive a first set of ranging packets at a first antenna array in a first location on the mobile device; calculate a first ranging value based at least in part on the first set of ranging packets; receive a second set of ranging packets at a second antenna array in a second location on the mobile device, where the second location is different from the first location; calculate a second ranging value based at least in part on the second set of ranging packets; compare the first ranging value and the second ranging value to determine a difference; compare the difference to a threshold; and when the difference is above a threshold, adjust at least one of the first ranging value and the second ranging value.

According to some implementations, a non-transitory computer-readable medium may store one or more instructions. The one or more instructions, when executed by one or more processors of a mobile device, may cause the one or more processors to: receive a first set of ranging packets at a first antenna array in a first location on the mobile device; calculate a first ranging value based at least in part on the first set of ranging packets; receive a second set of ranging packets at a second antenna array in a second location on the mobile device, where the second location is different from the first location; calculating a second ranging value based at least in part on the second set of ranging packets; compare the first ranging value and the second ranging value to determine a difference; compare the difference to a threshold; and when the difference is above a threshold, adjust at least one of the first ranging value and the second ranging value.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

Like reference symbols in the various drawings indicate like elements, in accordance with certain example implementations. In addition, multiple instances of an element may be indicated by following a first number for the element with a letter or a hyphen and a second number.

DETAILED DESCRIPTION

Certain embodiments are directed to techniques (e.g., a device, a method, a memory or non-transitory computer readable medium storing code or instructions executable by one or more processors) for enhanced ranging techniques to improve ranging techniques between electronic devices. Techniques to improve ranging between electronic devices (e.g., a mobile device and an electronic tag) can include using a three packet exchange between the electronic devices. Techniques can include exchanging the parameters (e.g., proposed transmission times) for a ranging session between an electronic device and a mobile device via a first wireless protocol (e.g., Bluetooth Low Energy).

The disclosed three packet exchange can measure various parameters of the exchange including the Round Trip Time (initiator), the Turn Around Time (responder), the Round Trip Time (responder), and Turn Around Time (responder). These measured parameters can be used to calculate a frequency offset ($\Delta$) from the observed frequency of the ranging frequency using a second wireless frequency (e.g., ultra-wide band (UWB)). If the computed frequency offset is different than the observed frequency by at least a threshold amount, it can be because the responding device has received interference due to multipath propagation on one or two of the transmissions. If responses are identified as multipath, the responses (and corresponding ranges) can be discarded, or weighted to minimize value, or not displayed (e.g., a previous range value may continue to be displayed).

A brief review of ranging and triangulation techniques follows below.

I. Ranging/Triangulation Techniques

A mobile device can include circuitry for performing ranging measurements. Such circuitry can include one or more dedicated antennas (e.g., three antennas) and circuitry for processing measured signals. The ranging measurements can be performed using the time-of-flight of pulses between the two electronic devices. In some implementations, a round-trip time (RTT) is used to determine distance information, e.g., for each of the antennas. In other implementations, a single-trip time in one direction can be used. The pulses may be formed using ultra-wideband (UWB) radio technology.

A. Sequence Diagram

Figure 1:
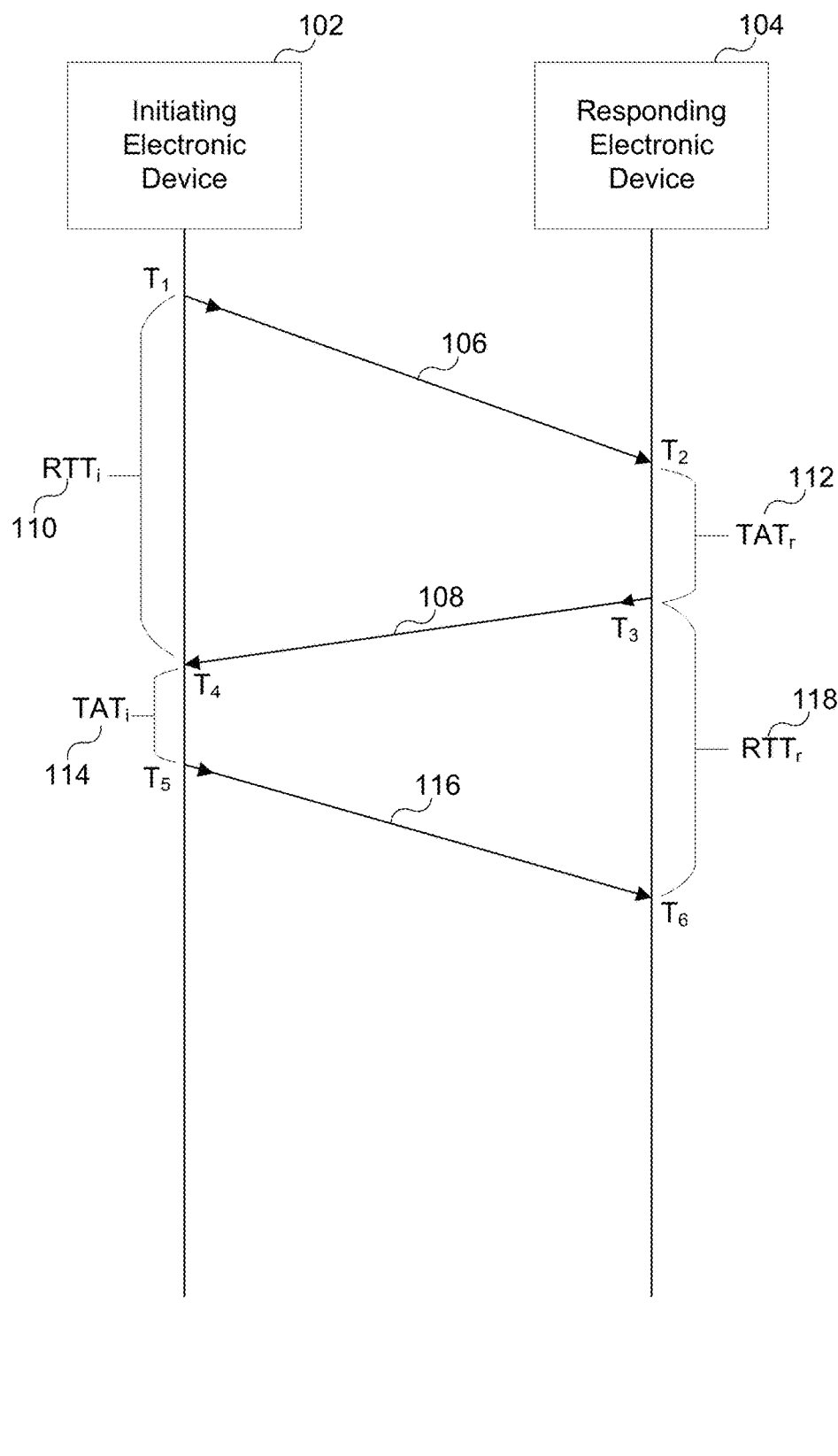
FIG. 1 shows a sequence diagram for performing a ranging measurement between two electronic devices according to embodiments of the present disclosure.

FIG. 1 shows a sequence diagram 100 for performing a ranging measurement between an initiating device and a responding electronic device according to embodiments of the present disclosure. The two electronic devices may belong to the same user. In various embodiments, the initiating electronic device can be a mobile device (e.g., a smart phone), a tablet computer, a laptop computer, or an electronic tag. The responding electronic device can be a mobile device (e.g., a smart phone), a tablet computer, or a laptop computer. The initiating electronic device can be electronically paired with the responding electronic device. The pairing process can provide the responding device with an identifier of the initiating electronic device. As described in more detail later, such an identifier can be used for authentication purposes, e.g., so ranging is not performed with unknown devices. Although FIG. 1 shows a single cycle of three packet exchanges (i.e., called ping-pong-ping), the process can be repeated to perform multiple measurements over a time interval as part of a ranging session, where such measurements can be averaged or otherwise analyzed to provide a single distance value, e.g., for each antenna.

An initiating electronic device 102 can initiate a ranging operation by transmitting a ranging request 106 to a responding electronic device 104 (e.g., a mobile device). Ranging request 106 can include a first set of one or more pulses. The ranging measurement can be performed using a ranging wireless protocol (e.g., UWB). The ranging measurement may be triggered in various ways, e.g., based on user input and/or authentication using another wireless protocol, e.g., Bluetooth Low Energy (BLE).

At $T_1$, the initiating electronic device 102 transmits ranging request 106. At $T_2$, the responding electronic device 104 receives ranging request 106. $T_2$ can be an average received time when multiple pulses are in the first set of one or more pulses. The responding electronic device 104 can be expecting the ranging request 106 within a time window based on previous communications, e.g., using another wireless protocol (e.g., BLE). The ranging wireless protocol and the another wireless protocol can be synchronized so that responding electronic device 104 can turn on the ranging antenna(s) and associated circuitry for a specified time window, as opposed to leaving them on for an entire ranging session.

In response to receiving the ranging request 106, the responding electronic device 104 can transmit ranging response 108. As shown, ranging response 108 can be transmitted at time $T_3$, e.g., a transmitted time of a pulse or an average transmission time for a set of pulses. $T_2$ and $T_3$ may also be a set of times for respective pulses. Ranging response 108 can include times $T_2$ and $T_3$ so that initiating electronic device 102 can compute distance information. The initiating electronic device 102 can receive the ranging response 108 at time $T_4$. Like the other times, $T_4$ can be a single time value or a set of time values. The time between $T_4$ and $T_1$ can be called the round trip time initiator (RTTi) 110. The initiating electronic device 102 can calculate distance information by first calculating the RTTi 110. The responding electronic device 104 can calculate the turn-around time responder (TATr) 112. The TATr 112 can be the time difference between $T_3$ and $T_2$. The TATr 112 can be transmitted to the initiating electronic device 102 as part of the ranging response 108. The TATr 112 can also be transmitted to the initiating electronic device 102 using a different wireless protocol (e.g., BLE). The initiating electronic device 102 can receive the TATr 112 in the ranging response 108. The initiating electronic device 102 can also receive the TATr 112 via a different wireless protocol (e.g., BLE). A first range can be calculated by subtracting the TATr 112 from the RTTi 110 and multiplying the difference by the speed of light (c). More complex calculations can also be used, e.g., when the times correspond to sets of times for sets of pulses and when a frequency correction is implemented.

The first range can be transmitted from the initiating electronic device 102 to the responding electronic device 104 by including the information on the second response message 116. The first range can be transmitted to the responding electronic device 104 using a different wireless protocol (e.g., BLE). The ranging response 108 can also include an identifier for the initiating electronic device 102, an identifier for the responding electronic device 104, or both.

The initiating electronic device 102 can receive a ranging response 108 at time $T_4$. Reception of the ranging response 108 can cause the initiating electronic device 102 to generate a second response message 116. The second response message 116 can be transmitted at time $T_5$. The initiating electronic device 102 can calculate a turn-around time initiator (TATi) 114 as the difference in time between $T_5$ and $T_4$. The second response message 116 can include the value for the TATi 114. The TATi 114 can be transmitted to the responding electronic device 104 via a different wireless protocol (e.g., BLE). The second response message 116 can also include an identifier for the initiating electronic device 102, an identifier for the responding electronic device 104, or both. The responding electronic device 104 can receive the second response message 116 at time $T_6$. Like the other times, $T_6$ can be a single time value or a set of time values. The responding electronic device 104 can calculate a round-trip time responder (RTTr) as the difference between $T_6$ and $T_3$. The second responder device 104 can subtract the TATi 114 from the RTTr 118. A second range between the devices can be calculated by multiplying the difference between RTTr 118 and TATi 114 by the speed of light (c). More complex calculations can also be used, e.g., when the times correspond to sets of times for sets of pulses and when a frequency correction is implemented. The second range can be transmitted to the initiating electronic device 102 using a different wireless protocol (e.g., BLE).

B. Triangulation to Determine Angle of Arrival

Figure 2:
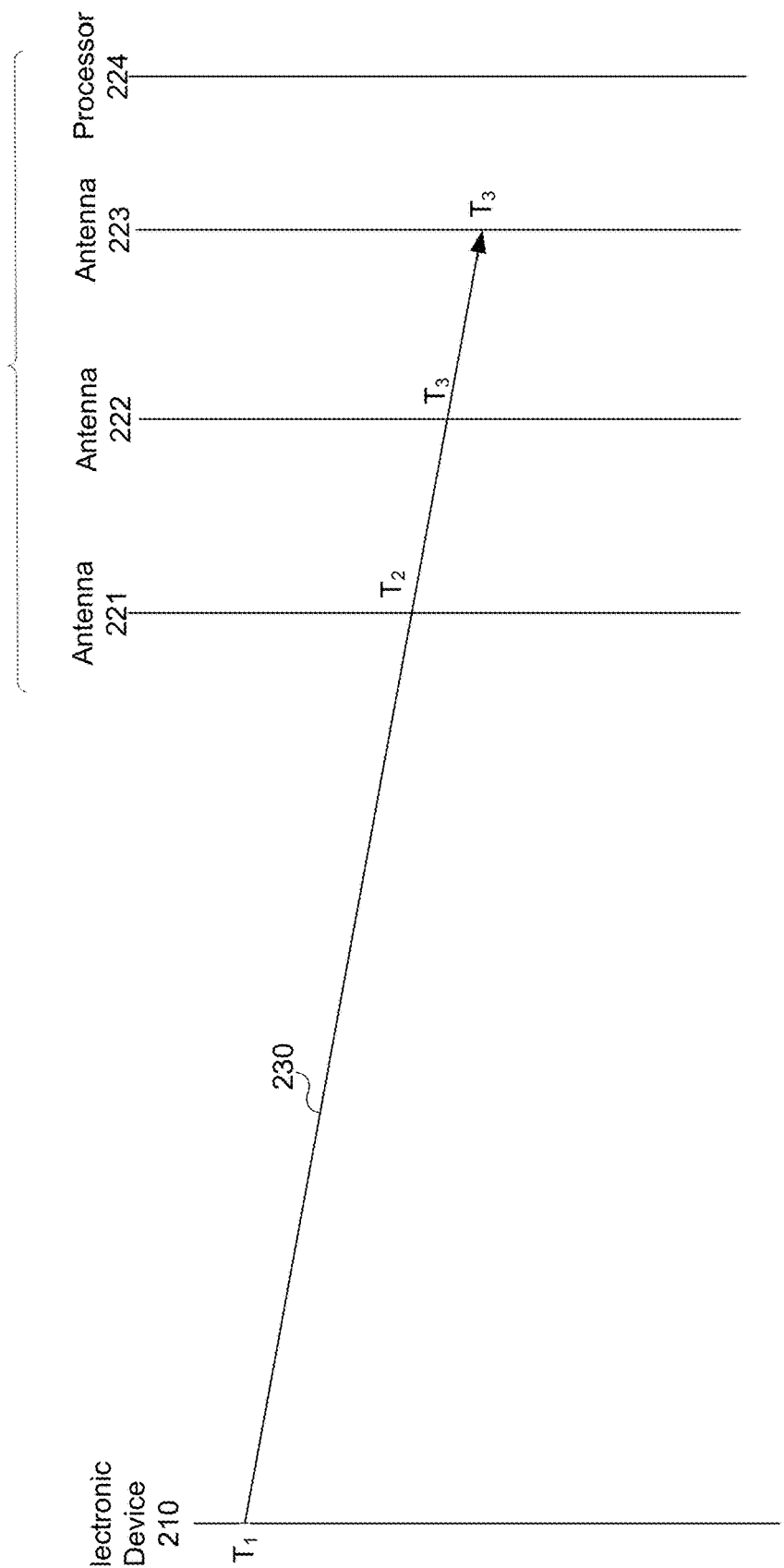
FIG. 2 illustrates a sequence diagram involving a primary device (referred to as a transmitting device or beacon) and a receiving device with a multiple-antenna array.

FIG. 2 shows a sequence diagram 200 of a ranging operation involving an initiating electronic device 210 and a mobile device 220 having three antennas 221, 222, and 223 according to embodiments of the present disclosure. Antennas 221, 222, 223 can be arranged to have different orientations, e.g., to define a field of view for calculating angle of arrival or for performing ranging measurements.

In this example of FIG. 2, each of antennas 221, 222, 223 receives a packet (including one or more pulses) that is transmitted by the initiating electronic device 210 (e.g., an electronic tag). The mobile device 220 can have multiple antennas, which can be used to determine angular information related to an orientation of mobile device 220 relative to electronic device 210. The electronic device 210 can transmit a ranging request 230 at time $T_1$. The ranging request 230 can travel at the speed of light. The ranging request 230 can be received at times $T_2$, T3, and T4, by antennas 221, 222, and 223 respectively. Thus, the antenna (s) (e.g., UWB antennas) of mobile device 220 can listen at substantially the same time. In various embodiments, each of the antennas 221, 222, and 223 can respond independently.

Processor 224 of mobile device 220 can calculate an angle of arrival to the electronic device 210. Processor 224 can receive the time of arrival of the packets from the antennas 221, 222, and 223. The mobile device 220 circuitry (e.g., UWB circuitry) can analyze the received signals from antennas 221, 222, 223. As described later, processor 224 can be an always-on processor that uses less power than an application processor that can perform functionality that is more general. The processor 224 can know the geometry of the three antennas on the phone. The processor 224 can also know the orientation of the mobile device 220 from one or more sensors on the mobile device 220 (e.g., accelerometer, gyroscope, and compass). With the known orientation of the antennas 221, 222, and 223, and the known orientation of the mobile device 220, the processor can use the times of arrival $T_2$, $T_3$, and $T_4$ to calculate an angle of arrival of the ranging request 230 to the initiating electronic device 210.

Accordingly, a mobile device 220 can have multiple antennas to perform triangulation. The separate measurements from different antennas can be used to determine a two-dimensional (2D) position, as opposed to a single distance value that could result from anywhere on a circle/sphere around the mobile device. The two-dimensional (2D) position can be specified in various coordinates, e.g., Cartesian or polar, where polar coordinates can comprise an angular value and a radial value.

Figure 3:
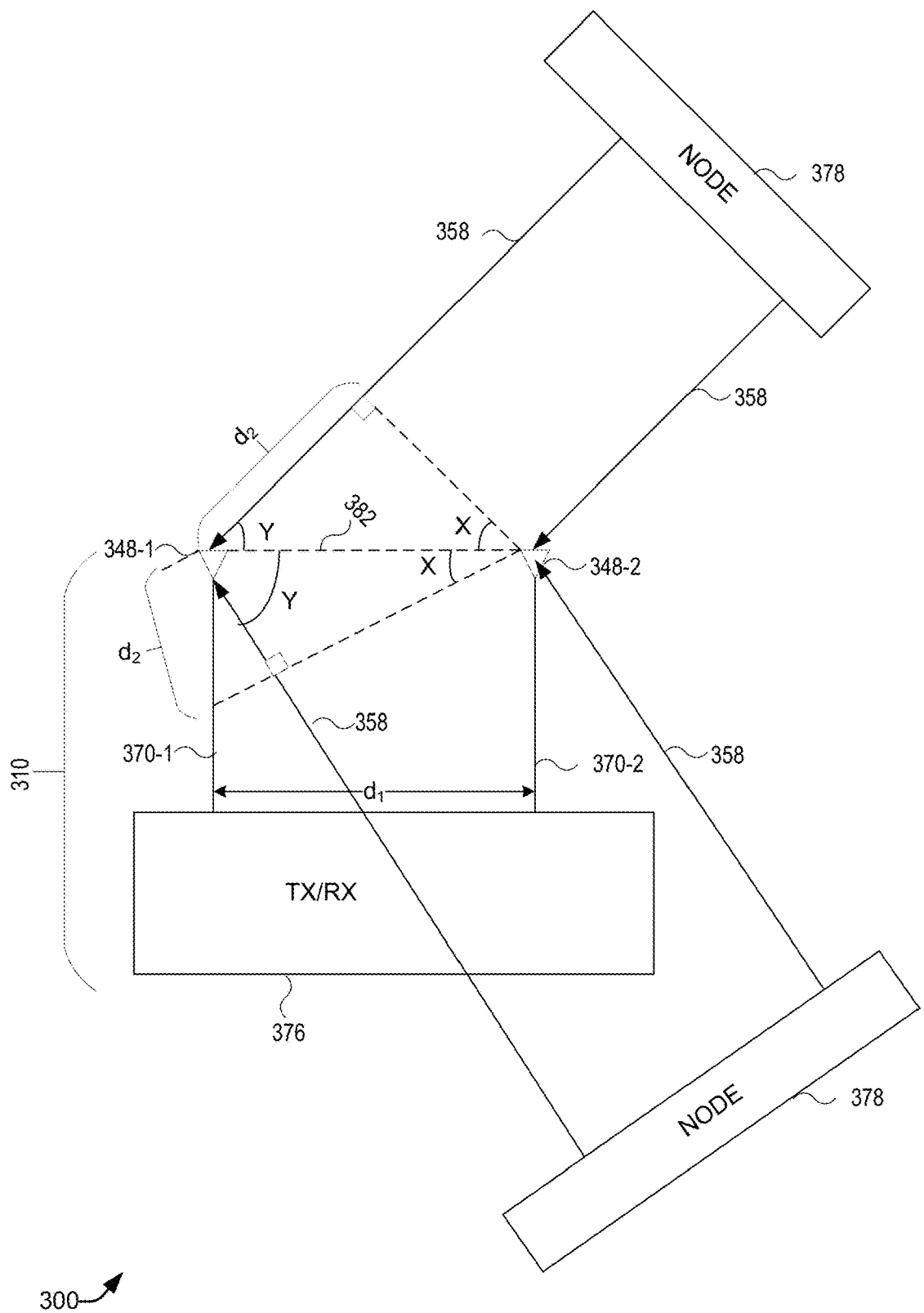
FIG. 3 is a schematic diagram showing how angle of arrival measurement techniques may be used to determine the orientation of mobile device relative to an electronic device.

FIG. 3 is a schematic diagram 300 showing how angle of arrival measurement techniques may be used to determine the orientation of device 310 relative to nodes 378. The term "node" may be used to refer to an electronic device, an object without electronics, and/or a particular location. In some arrangements, nodes may be associated with a mapped environment (e.g., the term node may refer to a device, object, or location in a mapped environment). Devices 310 may have control circuitry that determines where other nodes are located relative to device 310. The control circuitry in device 310 may synthesize information from cameras, motion sensors, wireless circuitry such as antennas, and other input-output circuitry to determine how far a node is relative to device 310 and/or to determine the orientation of device 310 relative to that node. The control circuitry may use output components in device 310 to provide output (e.g., display output, audio output, haptic output, or other suitable output) to a user of device 310 based on the position of the node. The control circuitry may, for example, use antenna signals and motion data to determine the angle of arrival of signals from other electronic devices to thereby determine the locations of those electronic devices relative to the user's electronic device.

As shown in FIG. 3, device 310 may include multiple antennas (e.g., a first antenna 348-1 and a second antenna 348-2) coupled to transceiver circuitry 376 by respective transmission lines 370 (e.g., a first transmission line 370-1 and a second transmission line 370-2). Antennas 348-1 and 348-2 may each receive a wireless signal 358 from node 378. Antennas 348-1 and 348-2 may be laterally separated by a distance $d_1$, where antenna 348-1 is farther away from node 378 than 348-2 (in the example of FIG. 3). Therefore, wireless communications signal 358 travels a greater distance to reach antenna 348-1 than 348-2. The additional distance between node 378 and antenna 348-1 is shown in FIG. 3 as distance $d_2$. FIG. 3 also shows angles x and y (where x+y=90°.

Distance $d_2$ may be determined as a function of angle γ or angle x (e.g., $d_2=d_1 \sin(x)$ or $d_2=d_1 \cos(y)$). Distance $d_2$ may also be determined as a function of the phase difference between the signal received by antenna 348-1 and the signal received by antenna 348-2 (e.g., $d_2=(\Delta\phi\lambda)/(2\pi)$, where $\Delta\phi$ is the phase difference between the signal received by antenna 348-1 and the signal received by antenna 348-2 and λ is the wavelength of the received signal 358). Device 310 may have phase measurement circuitry coupled to each antenna to measure the phase of the received signals and identify a difference in the phases ($\Delta\phi$). The two equations for $d_2$ may be set equal to each other (e.g., $d_1 \sin(x)=(\Delta\phi\lambda)/(2\pi)$) and rearranged to solve for angle x (e.g., $x=\sin^{-1}(\Delta\phi\lambda)/(2\pi d_1)$) or may be rearranged to solve for angle γ. As such, the angle of arrival may be determined (e.g., by control circuitry) based on the known (predetermined) distance between antennas 348-1 and 348-2, the detected (measured) phase difference between the signal received by antenna 348-1 and the signal received by antenna 348-2, and the known wavelength or frequency of the received signals 358.

Distance $d_1$ may be selected to ease the calculation for phase difference between the signal received by antenna 348-1 and the signal received by antenna 348-2. For example, $d_1$ may be less than or equal to one-half of the wavelength (e.g., effective wavelength) of the received signals 358 (e.g., to avoid multiple phase difference solutions).

Some antenna arrangements may be sufficient for resolving the "complete" angle of arrival of signals 358 without ambiguity. A complete angle of arrival (sometimes referred to as the direction of arrival) includes an azimuth angle θ and an elevation angle γ of node 378 relative to device 3.

Antennas that are located in a three-dimensional arrangement (e.g., spanning multiple planes) may be sufficient to determine the complete angle of arrival of signals 358 without ambiguity. However, when the baseline vectors (i.e., the vectors that extend between respective pairs of antennas) are all located in one plane, there may be some ambiguity as to the correct azimuth angle θ and/or the correct elevation angle γ of signals 358. In the two-antenna arrangement of FIG. 3, for example, there is only one baseline vector 382, which yields an accurate, unambiguous azimuth angle θ, but may not provide sufficient information to determine elevation angle φ. Thus, node 378' with a different elevation angle may nonetheless produce signals 358' with the same phase difference $\Delta\phi$ between the signal received by antenna 348-1 and the signal received by antenna 348-2 as signals 358. In other words, different directions of arrival may result in the same phase difference. This leads to an ambiguity in the angle of arrival solution. Without other information, control circuitry may be able to determine the azimuth angle θ of signals 358, but may be unable to determine elevation angle γ of signals 358. Systems with three or more coplanar antennas will resolve some but not all ambiguities in the angle of arrival because the baseline vectors will still be located in the same plane.

To help resolve ambiguities in the complete angle of arrival, control circuitry may combine antenna signals with motion data gathered using motion sensor circuitry. In particular, control circuitry may obtain angle of arrival measurements (e.g., measurements of azimuth angle θ and/or elevation angle φ) while device 310 is in multiple different positions. At each position, antennas 348 may receive signals 358 from node 378 and control circuitry may determine the possible angle of arrival solutions based on the phase difference between signals received by antenna 348-1 and signals received by antenna 348-2. Motion sensor circuitry may track the movement of device 310 as it is moved from one position to another. Using the motion data from motion sensor circuitry, control circuitry may associate each set of angle of arrival solutions with a different baseline vector 382. The baseline vectors may span multiple planes, thus providing sufficient information for control circuitry to determine the correct angle of arrival, just as if device 310 had a multi-planar antenna arrangement.

It should be understood that using a horizontal coordinate system and representing the complete angle of arrival with azimuth and elevation angles is merely illustrative. If desired, a Cartesian coordinate system may be used and the angle of arrival may be expressed using a unit direction vector that is represented using x, y, and z coordinates. Other coordinate systems may also be used. A horizontal coordinate system is sometimes described herein as an illustrative example.

II. Enhanced Ranging Techniques Between Electronic Devices

The disclosed enhanced ranging techniques can mitigate some of the issues associated with clock synchronization, clock frequency differences, and accurately detecting ranging requests and responses with transmissions using limited power for selected frequency bands. One of the features of the disclosed techniques includes setting up the conditions for the ranging session over a wireless protocol (e.g., BLE) prior to the ranging session. The setup can include exchanging a shared secret with both the initiating device and the responding device. This process can include pairing the initiating device with the responding device.

Figure 4:
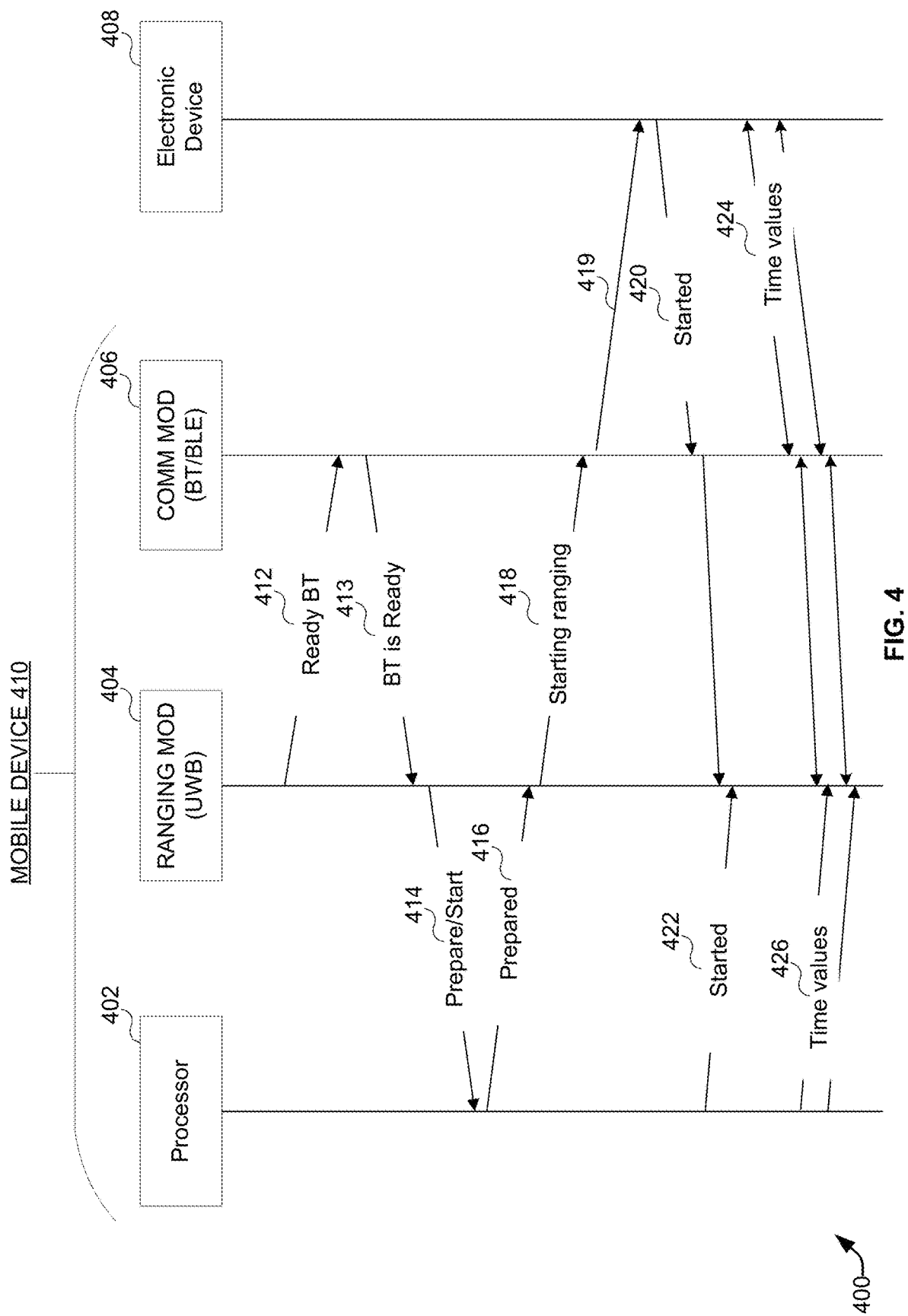
FIG. 4 illustrates an exemplary process for establishing a ranging session.

FIG. 4 illustrates an exemplary process 400 for establishing a ranging session between a mobile device 410 and an electronic device 408. A mobile device 410 can include a processor 402, a ranging module 404, and a communication module 406. The processor 402 can be an always-on processor. The ranging module 404 can communicate with an App requesting ranging services. The ranging module 404 operates using a wireless protocol (e.g., UWB). The communication module 406 can exchange information with the electronic device 408 using a wireless protocol (e.g., BLE).

The process 400 for establishing a ranging session can include each of the mobile device 410 and the electronic device 408 determining a projected time for each device to transmit a ranging message. This projected time can be determined to the millisecond level.

Both the mobile device 410 and the electronic device 408 can exchange the ranging information via a wireless protocol. The mobile device 410 and the electronic device 408 can use the connecting interval of Bluetooth to establish a time to start ranging. At the Bluetooth connection interval, the ranging can start on both sides, which reduces the window that the ranging module needs to search for the ranging signal. This saves on power and also ensures that there are not timing and interference issues as the devices attempt to start ranging at the same time. Such actions can effectively share the channel for the ranging protocol.

The ranging module 404 can send a communication preparation message 412. The communication initiation message 412 can be sent to the communication module 406 to prepare a wireless communication message to coordinate the ranging session. The communication module 406 can send a response message 413 informing the ranging module 404 that the communication module 406 is ready to begin ranging and transmit the communication messages.

The ranging module 404 can send a processor preparation message 414 to the processor 402. The processor 402 can determine one or more times for transmitting the ranging messages from the mobile device 410 to the electronic device 408. The processor 402 can send a message 416 to the ranging module 404 indicating that the processor 402 is prepared to conduct ranging.

The ranging module 404 can send an initiation message 418 to the communication module 406. The initiation message 418 can include the calculated times for sending the response messages. The communication module 406 can transmit a first message 419 to the electronic device 408 over a wireless protocol. As examples, the wireless protocol can be Bluetooth or Bluetooth Low Energy. The first message can include an identifier for the mobile device 410 and instructions to begin ranging. The first message can also include one or more parameters of the ranging exchange.

The electronic device 408 can transmit a first start message 420 informing the mobile device 410 that the electronic device 408 has received the initiation message 418. The electronic device 408 can transmit the start message 420 over a wireless protocol (e.g., Bluetooth). Similarly, the processor 402 can send a second start message 422 informing the ranging module 404 to start ranging. The electronic device 408 can include a processor that generates one or more first time values 424 indicating when the ranging request will be transmitted. The one or more first time values 424 can be transmitted over the wireless protocol (e.g., Bluetooth) and be received by the communication module 406 of the mobile device 410. The one or more first time values 424 can be stored in a memory of the mobile device 410. The ranging module 404 can use the time values 424 to determine when to expect the ranging requests from the electronic device 408. The electronic device 408 can calculate its own measurements and send the calculated time values 424 over the wireless protocol to the mobile device 410, which can use the time values 424 to coordinate and make the calculations for transmission of responses to the ranging requests.

The processor 402 can generate one or more second time values 426 that indicate when the ranging module 404 will transmit one or more response messages to the ranging request from the electronic device 408. The one or more second time values 426 can be presented to the ranging module 404 to calculate arrival of the second response message from the electronic device 408. The electronic device 408 can receive the one or more second timestamps 426 and store them in a memory. The electronic device 408 can use the one or more second time values 426 to determine when the electronic device 408 should listen for the response to the ranging request. The processor 402 can receive the calculations from the electronic device 408.

A. Low Energy Protocols

As described above, electronic device 408 can transmit a timing signal via a wireless protocol (e.g., Bluetooth Low Energy (BLE) advertising). One of the advantages of BLE is lower power consumption even when compared to other low power technologies. BLE achieves the optimized and low power consumption by keeping the radio off as much as possible and sending small amounts of data at low transfer speeds. Another advantage of BLE is that it is enabled in most smartphones in the market.

One of the limitations of BLE is limited data throughput. The data throughput of BLE is limited by the physical radio layer (PHY) data rate, which is the rate at which the radio transmits data. This rate depends on the Bluetooth version used. For Bluetooth 4.2 and earlier, the rate is fixed at 1 megabits per second (Mbps). For Bluetooth 5 and later, however, the rate varies depending on the mode and PHY used. The rate can be 1 Mbps like earlier versions, or 2 Mbps when utilizing the high-speed feature. Another limitation of BLE is the limited range. Bluetooth Low Energy (and Bluetooth in general) was designed for short-range applications and hence the range of operation is limited. There are a few factors that limit the range of BLE. The factors include that BLE operates in the 2.4 GHz Industrial, Scientific, and Medical (ISM) spectrum which is greatly affected by obstacles that exist all around us such as metal objects, walls, and water (especially human bodies). Other factors include performance and design of the antenna of the BLE device, physical enclosure of the device, and device orientation.

BLE requires a gateway for Internet connectivity. In order to transfer data from a BLE-only device to the Internet, another BLE device that has an IP connection is needed to receive this data and then, in turn, relay it to another IP device (or to the Internet).

In the advertising state, a device sends out packets containing useful data for others to receive and process. The packets are sent at a fixed interval defined as the Advertising Interval. The interval can be random or pseudo-random. There are 40 radio frequency (RF) channels in BLE, each separated by 2 MHz (center-to-center). Three of these channels are called the Primary Advertising Channels, while the remaining 37 channels are used for Secondary Advertisements and for data packet transfer during a connection. A central device discovers BLE peripherals and broadcasters with the capability of connecting to peripheral devices. Advertisements can start with advertisement packets sent on the three Primary Advertising Channels (or a subset of these channels). This allows central devices to find the Advertising device (Peripheral or Broadcaster) and parse its advertising packets. The central device can then initiate a connection if the advertiser allows it (e.g., peripheral devices).

B. Ultra-Wideband Packet Transmissions

Ultra-Wide Band (UWB) transmissions are not continuous transmissions, so a receiving device looking to acquire the UWB transmission would either need knowledge of the start time of the transmission or would need to expend energy in a powered-on state listening until the device captures the impulse UWB signal. If the receiving device knows even an approximate time of transmission, the receiver can remain in a reduced-power or sleep mode until just prior to the transmission time. For UWB communications, it can be challenging for the receiving device to know when the first packet is going to arrive.

A technique to propagate the UWB transmission times is to broadcast the transmission time information at a defined time after an advertisement signal using another wireless protocol, e.g., Bluetooth Low Energy (BLE) advertisement transmissions. Although examples may refer to Bluetooth, other wireless protocols may be used. BLE has 40 physical channels in the 2.4 GHz ISM band, each separated by 2 megahertz (MHz). Bluetooth defines two transmission types: data and advertising transmissions. As such, three of these 40 channels are dedicated to advertising and 37 dedicated to data. Advertising allows devices to broadcast information defining their intentions.

The UWB information packets can be structured to transmit at a specific time relative to the transmitting device's BLE advertisements. Accordingly, the receiving device can listen for the UWB packets at an expected time or during an expected time window around the expected time. The UWB packets can convey transmitting device information, deep links, and/or transmission time information. The receiver device can use the time in the BLE advertising message to determine when to listen for the next poll. The UWB packets can be transmitted in the UWB frequency range.

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the ranging wireless protocol (e.g., UWB) can provide distance accuracy of 5 cm or better. In various embodiments, the frequency range can be between 3.1 to 10.6 Gigahertz (GHz). Multiple channels can be used, e.g., one channel at 6.5 GHz, another channel at 8 GHz. Thus, in some instances, the ranging wireless protocol does not overlap with the frequency range of the first wireless protocol (e.g., 2.4 to 2.485 GHz).

The ranging wireless protocol can be specified by IEEE 802.15.4, which is a type of UWB. Each pulse in a pulse-based UWB system can occupy the entire UWB bandwidth (e.g., 500 MHz), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a media access control (MAC) layer, and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates to which stage the message corresponds, e.g., ranging requests can correspond to stage 1 and ranging responses can correspond to stage 2. Such use of an indicator may be helpful when more than two devices are performing ranging operations near each other.

The narrow pulses (e.g., ~one nanosecond width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging waveform of plus 1's and minus 1's in some pattern that is recognized by a receiver. The distance measurement can use a round trip time measurement, also referred to as a time-of-flight measurement. As described above, the mobile device can send a set of timestamps, which can remove a necessity of clock synchronization between the two devices.

Mobile devices may use Global Navigation Satellite Systems (GNSS) (e.g., Global Positioning System (GPS)) or other location circuitry to determine the location of the mobile device. For example, a map application can show an approximate location of the mobile device on a map. However, such techniques for determining location are typically determined relative to some external reference frame that is fixed, and not to a variable reference frame, e.g., another mobile device. Additionally, GNSS systems can be limited indoors or in areas of blocked signals (e.g., dense urban environments) or suffer from inaccuracies from reflected signals. Further, the standard accuracy for GPS systems is currently 4 meters for horizontal accuracy and worse for vertical accuracy. Enhanced communication techniques can allow for information exchanges that allow for angular determination, ranging, and information exchanges between electronic devices.

III. Enhanced Communication Techniques

In various embodiments, the beacon communication techniques can be used to provide information to receiving devices based on a positioning of the receiving device. In this way, the user(s) of the one to many receiving devices can indicate an interest in the information prior to receiving the information from the transmitting device. Pre-existing location-based services may provide advertising to receiving devices based on location, but this can be undesirable and unwanted by users because location alone may not indicate interest by the user.

A. Calculating Frequency Offset

Figure 5:
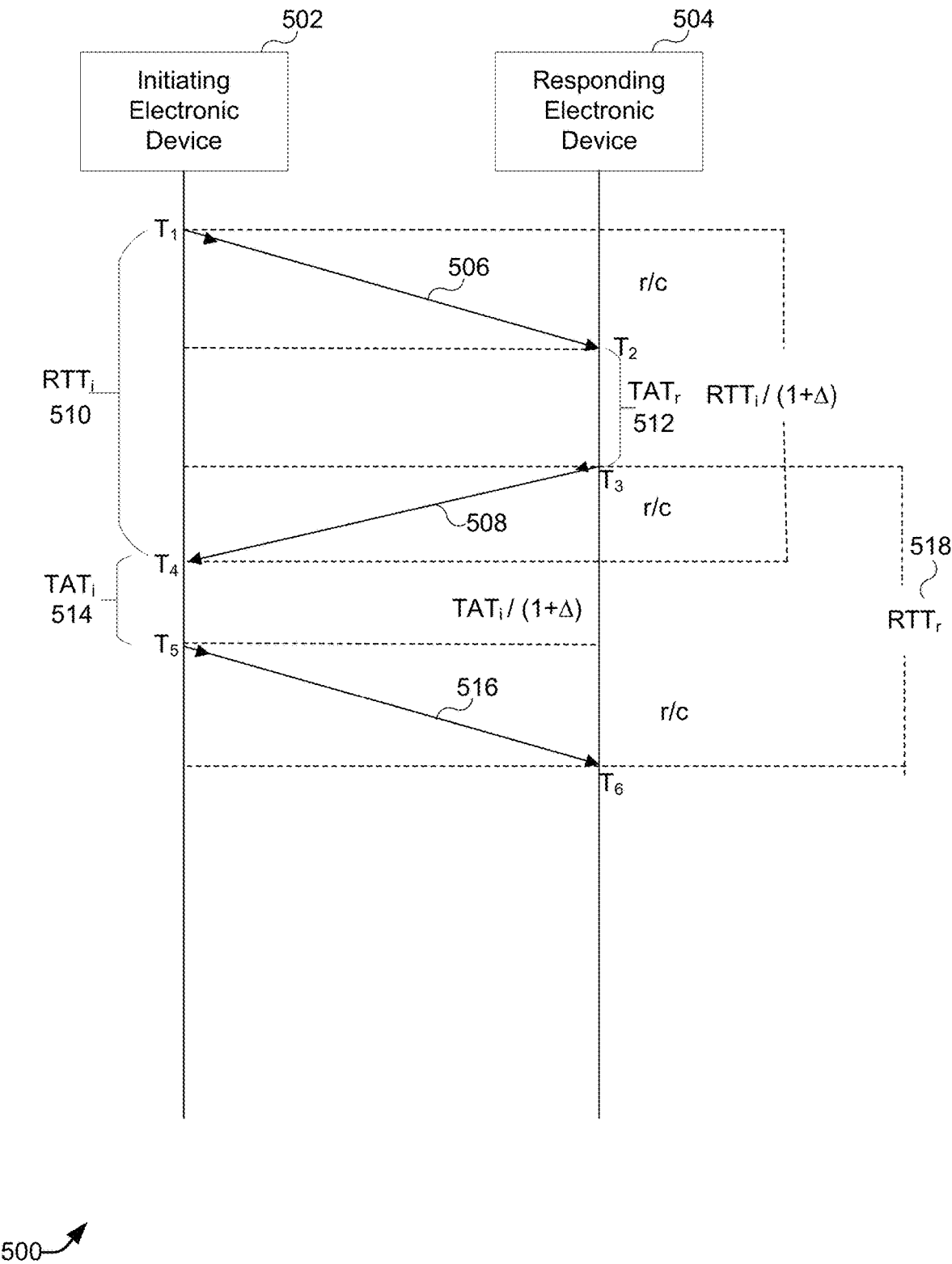
FIG. 5 illustrates a ranging exchange used for determining a frequency offset.

FIG. 5 illustrates a ranging exchange 500 used for determining a frequency offset. The ranging exchange can be done using a second wireless protocol (e.g., UWB). After the coordination as shown and described in FIG. 4 is complete, the ranging exchange between the initiating electronic device 502 and the responding electronic device 504 can begin. The initiating electronic device 502 can correspond to the initiating electronic device 102 shown in FIG. 1. The responding electronic device 504 can correspond to the responding electronic device 104 as shown in FIG. 1.

Calculating the frequency offset can be used to determine if the response messages are subject to multipath propagation. While the exchange of timestamps as discussed above allows for calculation of round trip time, it does it to the millisecond level. The techniques as described herein assist in bringing the timing accuracy to the nanosecond level which is useful for accurate calculations at shorter distances. One problem is that the clocks for each device are not synchronized. A time indicated on the initiating electronic device 502 is likely different from a time on the responding electronic device 504. In addition, each of the clocks for the initiating electronic device 502 and the responding electronic device 504 can run at slightly different frequencies. Those frequencies matter on the time scale for computing accurate ranges at close distances. The lack of synchronization and the different rates can result in inaccurate range measurements. If the frequency offset between the clocks was not corrected, the calculated range could be off by meters. The techniques can correct for the frequency offset down to about ½ meter in distance.

This technique can assume that there is an oscillator frequency offset between the two devices:

$$t_i = (1+\Delta)t_r + \gamma,$$

where $t_i$=the time for the initiating device; $t_r$ is the time for the responding device; $\Delta$ is the offset; and $\gamma$ is the offset that will occur due to unsynchronized clocks.

An initiating electronic device 502 can initiate a ranging operation by transmitting a ranging request 506 to a responding electronic device 504 (e.g., a mobile device). Ranging request 506 can include a first set of one or more pulses. The ranging measurement can be performed using a ranging wireless protocol (e.g., UWB). The ranging measurement may be triggered in various ways, e.g., based on user input and/or authentication using another wireless protocol, e.g., Bluetooth Low Energy (BLE).

At $T_1$, the initiating electronic device 502 transmits ranging request 506. At $T_2$, the responding electronic device 504 receives ranging request 506. $T_2$ can be an average received time when multiple pulses are in the first set of one or more pulses. The responding electronic device 504 can be expecting the ranging request 506 within a time window based on previous communications, e.g., using another wireless protocol (e.g., BLE) as discussed above. This time window can be on the order of around 3 milliseconds. The ranging wireless protocol and the another wireless protocol can be synchronized so that responding electronic device 504 can turn on the ranging antenna(s) and associated circuitry for a specified time window, as opposed to leaving them on for an entire ranging session.

In response to receiving the ranging request 506, the responding electronic device 504 can transmit ranging response 508. As shown, ranging response 508 can be transmitted at time $T_3$, e.g., a transmitted time of a pulse or an average transmission time for a set of pulses. $T_2$ and $T_3$ may also be a set of times for respective pulses. Ranging response 508 can include times $T_2$ and $T_3$ so that initiating electronic device 502 can compute distance information. The initiating electronic device 502 can receive the ranging response 508 at time $T_4$. Like the other times, $T_4$ can be a single time value or a set of time values. The time between $T_4$ and $T_1$ can be called the round trip time initiator (RTTi) 510. The initiating electronic device 502 can calculate distance information by first calculating the RTTi 510.

The responding electronic device 504 can calculate the turn-around time responder (TATr) 512. The TATr 512 can be the time difference between $T_3$ and $T_2$. The TATr 512 can be transmitted to the initiating electronic device 502 as part of the ranging response 508. The TATr 512 can also be transmitted to the initiating electronic device 502 using a different wireless protocol (e.g., BLE). The initiating electronic device 502 can receive the TATr 512 in the ranging response 108. The initiating electronic device 502 can also receive the TATr 512 via a different wireless protocol (e.g., Bluetooth). A first range can be calculated by subtracting the TATr 512 from the RTTi 510 and multiplying the difference by the speed of light (c). More complex calculations can also be used, e.g., when the times correspond to sets of times for sets of pulses and when a frequency correction is implemented.

The initiating electronic device 502 can transmit the calculated RTTi 510 to the responding electronic device 504 via a different wireless protocol (e.g., Bluetooth).

The first range can be transmitted from the initiating electronic device 502 to the responding electronic device 504 by including the information on the second response message 516. The first range can be transmitted to the responding electronic device 504 using a different wireless protocol (e.g., BLE). The ranging response 508 can also include an identifier for the initiating electronic device 502, an identifier for the responding electronic device 504, or both.

The initiating electronic device 502 can receive a ranging response 508 at time $T_4$. Reception of the ranging response 508 can cause the initiating electronic device 502 to generate a second response message 516. The second response message 516 can be transmitted at time $T_5$. The initiating electronic device 502 can calculate a turn-around time initiator (TATi) 514 as the difference in time between $T_5$ and $T_4$. The second response message 516 can include the value for the TATi 514. The TATi 514 can be transmitted to the responding electronic device 504 via a different wireless protocol (e.g., BLE). The second response message 516 can also include an identifier for the initiating electronic device 502, an identifier for the responding electronic device 504, or both. The responding electronic device 504 can receive the second response message 516 at time $T_6$. Like the other times, $T_6$ can be a single time value or a set of time values.

The responding electronic device 504 can calculate a round-trip time responder (RTTr) 118 as the difference between $T_6$ and $T_3$. The second responder device 104 can subtract the TATi 114 from the RTTr 115. A second range between the devices can be calculated by multiplying the difference between RTTr 518 and TATi 514 by the speed of light (c). More complex calculations can also be used, e.g., when the times correspond to sets of times for sets of pulses and when a frequency correction is implemented. The second range can be transmitted to the initiating electronic device 502 using a different wireless protocol (e.g., BLE).

The responding electronic device 504 can transmit the calculated RTTr 518 to the initiating electronic device 502 via a different wireless protocol (e.g., Bluetooth). The responding electronic device 504 can also transmit a calculated second range and send the second calculated range to the responding electronic device 504 via a different wireless protocol (e.g., Bluetooth).

Two equations can be formed based on all three times of arrival:

$$\frac{RTTi}{(1+\Delta)} = \frac{2r}{c} + TATr$$

$$RTTr = \frac{2r}{c} + \frac{TATi}{(1+\Delta)}TATr,$$

where r is equal to the range between the devices; c is the speed of light, and $\Delta$ is the frequency offset.

Using these two equations, with two unknowns, one can solve for the frequency offset ($\Delta$) using the following equation:

$$\Delta = \frac{RTTi + TATi - RTTr - TATr}{RTTr + TATr}.$$

The frequency offset can be compared to the signal's observed frequency offset at the responding electronic device 504. If the computed frequency offset differs from the observed frequency offset by more than a threshold amount, it can show that the responding electronic device 504 received interference or experienced multipath propagation on one or two of the transmissions. When the responding electronic device 504 receives a signal it can calculate both an arrival and frequency at which the peak of the wireless signal is at the highest. Therefore, the observed frequency offset can be calculated in both time and frequency.

This can be compared with the acquisition of GPS timing signals. In GPS, the satellite vehicle is traveling at around 4 kilometers per second. The GPS receiver would need to see the frequency offset of the timing signal as well as the time offset to account with the speed of the satellite vehicle or the GPS receiver will never find it. In GPS, there is a Doppler shift due to the motion of the satellite vehicle. Here, there is Doppler shift that is due to the fact that both the clocks are running at different rates.

The frequency offset can be used for future range calculations, although the frequency offset does not remain constant. For the timescale for the ranging session (e.g., 30 millisecond) it can be assumed that the frequency offset remains about constant. But this process needs to be repeated for each ranging session between the devices.

The calculated frequency offset can be compared with the observed frequency offset. If the difference between the calculated frequency offset and the observed frequency offset exceeds a threshold value, multipath propagation can be suspected. These enhanced ranging techniques help reduce ranging errors down to 0.5 meters. If the difference exceeds a threshold, the range values can be marked with low confidence, or weighted to mitigate its effect on an average range value over time. In various embodiments, if the difference exceeds a threshold, the range value will not be displayed or a previous value of range will continue to be displayed.

In various embodiments, the location feature can be selected from an App on the responding electronic device 504 (e.g., the mobile device). The initiating electronic device 502 (e.g., an electronic tag) can be selected to range from one or more devices paired with the responding device 504. Once selected, the responding electronic device 504 can conduct a ranging session with the initiating electronic device 502 using the techniques described above. The responding electronic device 504 can display a message on the display that it is searching for the initiating electronic device 502. Instructions on the display of the responding electronic device 504 can prompt the user to move the responding electronic device 504. Once located, responding electronic device 504 can display a range to the initiating electronic device 502. The responding electronic device 504 can also display a direction (e.g., an arrow) toward the initiating electronic device 502. The responding electronic device 504 can also display a direction and distance in text to the initiating electronic device 502. As the device gets closer, the responding electronic device 504 may only display a range to the initiating electronic device 502. The responding electronic device 504 can display that the responding electronic device 504 is at the initiating electronic device 502 when it is within a minimum distance from the initiating electronic device 502.

In some implementations, a method of ranging via a wireless protocol with an electronic device by a mobile device can include the following steps performed by the mobile device.

Step 1 can include obtaining a first set of time measurements for signals sent and received by the mobile device for a ranging session between the mobile device and the electronic device. The first set of time measurements can be received via a wireless protocol (e.g., Bluetooth, UWB). A portion of the first set of time measurements can be calculated by the processor of the mobile device.

Step 2 can include obtaining a second set of time measurements for signals sent and received by the electronic device for the ranging session. A portion of the second set of time measurements can be calculated by the processor of the mobile device.

Step 3 can include calculating a frequency offset between a first oscillator of the mobile device and a second oscillator of the electronic device using the first set of time measurements and the second set of time measurements.

Step 4 can include comparing an observed frequency offset to the calculated frequency offset to determine a frequency offset difference.

When the frequency offset difference exceeds a threshold, step 5 can include adjusting a ranging measurement for the ranging session.

IV. Flow for Enhanced Ranging Techniques

Figure 6:
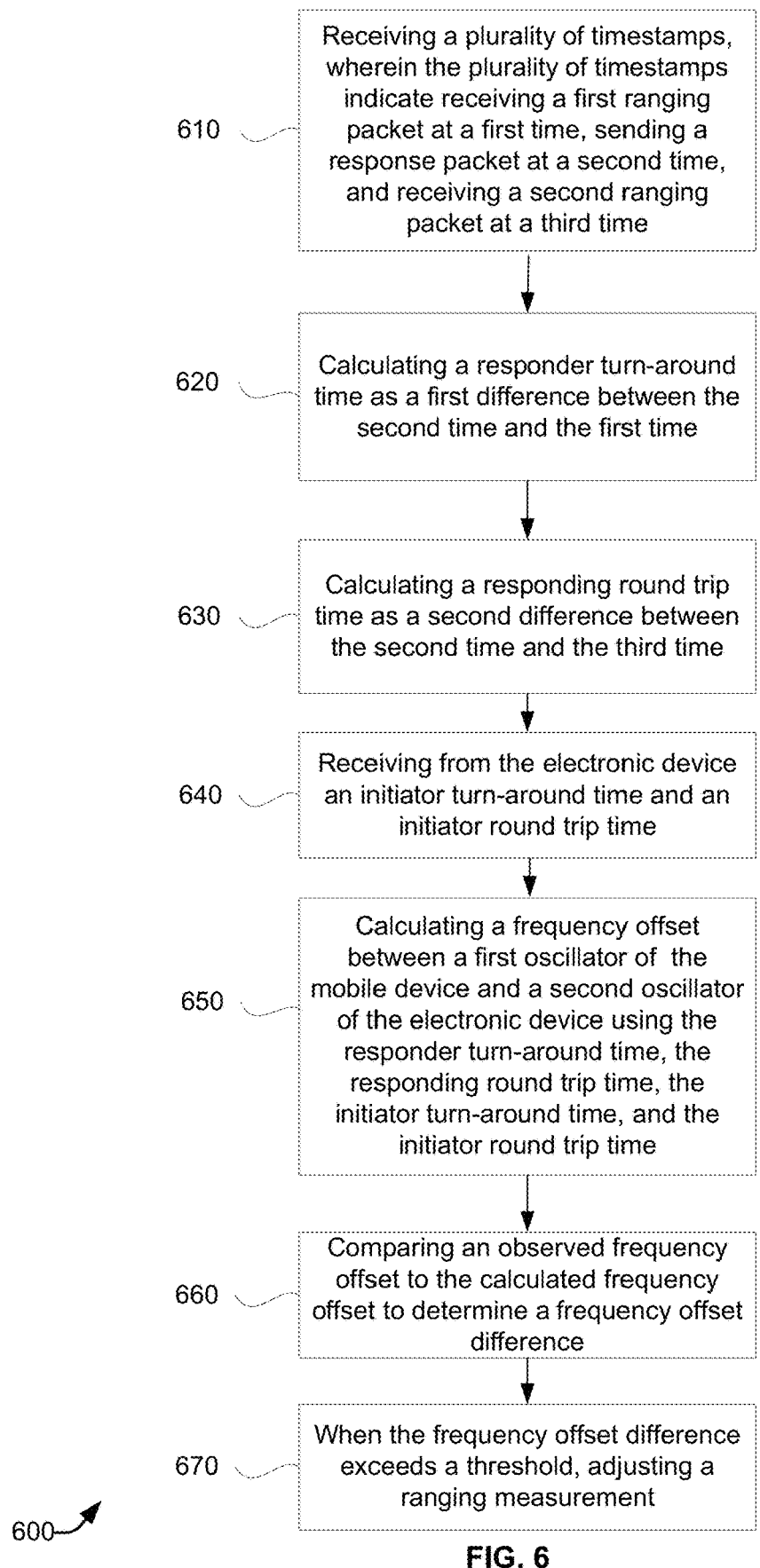
FIG. 6 illustrates an exemplary flowchart for an enhanced ranging technique performed by a mobile device.

FIG. 6 is a flow chart of process 600 for techniques for improving ranging techniques between electronic devices. In some implementations, one or more process blocks of FIG. 6 can be performed by a mobile device. In some implementations, one or more process blocks of FIG. 6 can be performed by another device or a group of devices separate from or including the mobile device. Process 600 can determine frequency offsets as described for FIG. 5.

Figure 11:
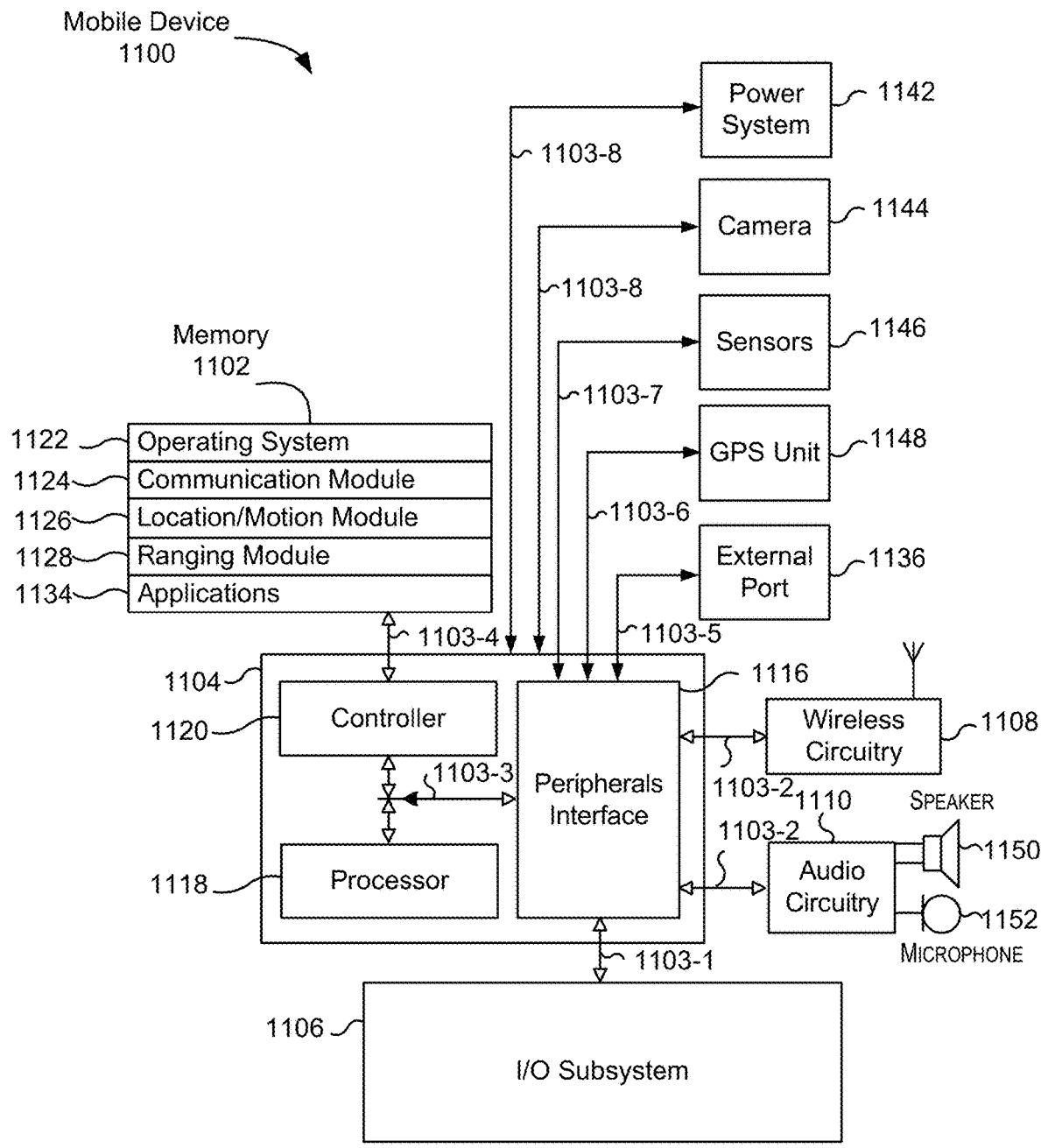
FIG. 11 is a block diagram of an example device according to embodiments of the present disclosure.

At 610, process 600 can include receiving a plurality of timestamps, wherein the plurality of timestamps indicate receiving a first ranging packet at a first time, sending a response packet at a second time, and receiving a second ranging packet at a third time. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can receive a plurality of timestamps, as described above. In some implementations, the plurality of timestamps indicate receiving a first ranging packet at a first time, sending a response packet at a second time, and receiving a second ranging packet at a third time. The timestamps can be stored to a memory by the processor following reception and transmission of the packets by the mobile device. The first ranging packet, the response packet, and the second ranging packet can be sent and received over a second wireless protocol (e.g., UWB).

At 620, process 600 can include calculating a responder turn-around time as a first difference between the second time and the first time. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can calculate a responder turn-around time as a first difference between the second time and the first time, as described above.

At 630, process 600 can include calculating a responding round trip time as a second difference between the second time and the third time. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can calculate a responding round trip time as a second difference between the second time and the third time, as described above.

At 640, process 600 can include receiving from the electronic device an initiator turn-around time and an initiator round trip time. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can receive from the electronic device an initiator turn-around time and an initiator round trip time, as described above.

At 650, process 600 can include calculating a frequency offset between a first oscillator of the mobile device and a second oscillator of the electronic device using the responder turn-around time, the responding round trip time, the initiator turn-around time, and the initiator round trip time. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can calculate a frequency offset between the wireless protocol from the mobile device and the wireless protocol of the electronic device using the responder turn-around time, the responding round trip time, the initiator turn-around time, and the initiator round trip time, as described above.

At 660, process 600 can include comparing an observed frequency offset to the calculated frequency offset to determine a frequency offset difference. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can compare an observed frequency offset to the calculated frequency offset to determine a frequency offset difference, as described above. The observed frequency offset can be calculated by measuring Doppler shift around a carrier frequency.

At 670, when the frequency offset difference exceeds a threshold, the process 600 can include adjusting a ranging measurement. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can, when the frequency offset difference exceeds a threshold, adjust a ranging measurement, as described above. The threshold can be stored in a memory of the device.

Process 600 can include additional implementations, such as any single implementation or any combination of implementations described below and/or in connection with one or more other processes described elsewhere herein. It should be appreciated that the specific steps illustrated in FIG. 6 provide particular techniques for improving ranging techniques between electronic devices according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 6 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, the observed frequency offset is determined from a measured signal of the wireless protocol of the electronic device.

In some implementations, process 600 includes calculating a range between the electronic device and the mobile device using the responder round trip time and the initiator turn-around time. The range can be calculated by subtracting the initiator turn-around time from the responder round trip time and dividing the difference by the speed of light. The calculated range can be stored in the memory of the mobile device. The mobile device can display the calculated range on the display. The mobile device can transmit the calculated range to the electronic device.

In some implementations, process 600 includes receiving, via the wireless protocol, an information packet comprising a first timestamp from the electronic device in a first ranging packet, the first timestamp indicating a first transmission time of the first ranging packet; calculating a second timestamp indicating a second transmission time for the mobile device to transmit a response packet to the first ranging packet; and sending, via the first wireless protocol, the calculated second timestamp to the electronic device. The electronic device can calculate In some implementations, the adjusting of the ranging measurement comprises applying a weighting to the ranging measurement based at least on the frequency offset difference.

In some implementations, process 600 includes displaying a previously calculated ranging based at least on the frequency offset difference.

In some implementations, process 600 includes calculating a direction to the electronic device based at least in part on the received data packets.

In various embodiments, a mobile device can include one or more memories; and one or more processors in communication with the one or more memories and configured to execute instructions stored in the one or more memories to performing operations of a method described above.

In various embodiments, a computer-readable medium storing a plurality of instructions that, when executed by one or more processors of a computing device, cause the one or more processors to perform operations of any of the methods described above.

Although FIG. 6 shows example steps of process 600, in some implementations, process 600 can include additional steps, fewer steps, different steps, or differently arranged steps than those depicted in FIG. 6. Additionally, or alternatively, two or more of the steps of process 600 can be performed in parallel.

V. Techniques Using Antenna Diversity to Determine Multipath Propagation

Figure 7:
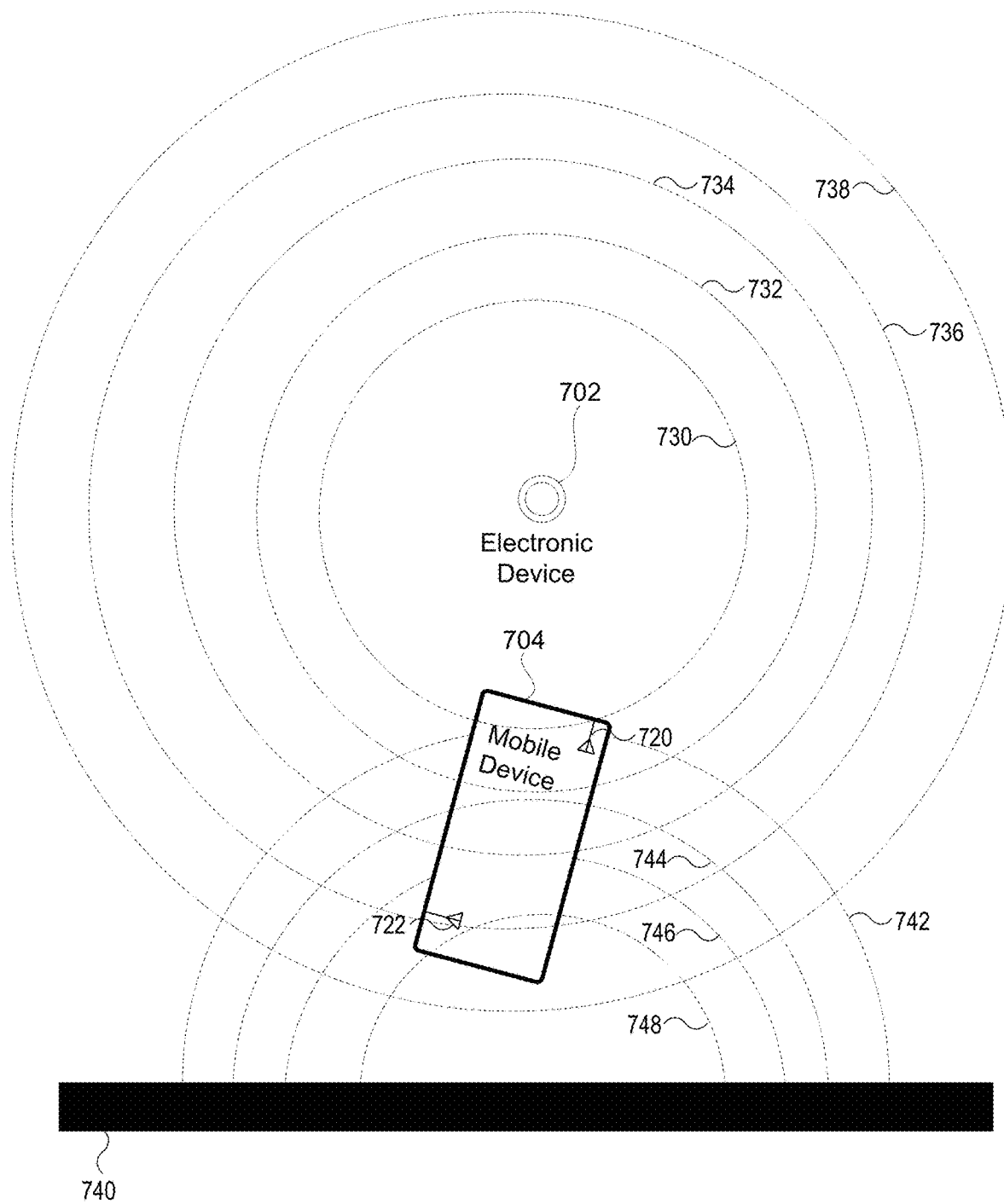
FIG. 7 illustrates an example ranging session between a mobile device and an electronic device.

FIG. 7 illustrates an example ranging session 700 between an electronic device 702 and a mobile device 704. The electronic device can transmit one or more ranging requests 730, 732, 734, 736, and 738. The ranging requests can be reflected off objects such as a wall 740 resulting in multipath signals 742, 744, 746, and 748.

The mobile device 703 can include two antennas 720, 722 placed at a first location and a second location on the mobile device 703. The antennas can be on the same side of the device 703 or can be on different sides of the device. In addition to being at different locations, the antennas can be at different orientations relative to each other. For example, first antenna 720 is about 90 degrees different from second antenna 722. The two antennas 720, 722 can be a single antenna or an antenna array consisting of several antennas.

The first antenna 720 and the second antenna 722 are at different positions and different orientations from the transmitting device (e.g., the electronic device 702). As such, the first antenna 720 may calculate a different range from the second antenna 722. Multipath propagation, such as illustrated in FIG. 7, when the ranging signals reflect off a hard surface (e.g., a wall 740) can result in inaccurate range results. Having a diversity of antenna positions and orientations can allow the mobile device 704 to receive ranging signals from multiple paths to allow for easy discrimination of signals. For example, the first antenna 720 may calculate a range based on ranging request 730 and a different range from multipath signal 742. Multipath signals will always result in longer ranges due to longer propagation times. The mobile device 704 can recognize the multipath propagation and prioritize the first antenna 720 over the second antenna 722 due to the preferred position and orientation.

In some embodiments, the mobile device can include other sensors to aid in determining a preferred antenna to minimize multipath propagation. For example, the mobile device 704 can include a visual, inertial, odometry (VIO) sensor. In computer vision, visual odometry is the process of determining the position and orientation of a device by analyzing the associated camera images. An inertial measurement unit (IMU) can be added to the Visual Odometry (VO) sensor. The VIO sensor can be used to determine the movement and orientation of the mobile device 704. The movement and orientation of the mobile device 704 can be used to determine a preferred antenna that would be in a preferred position to minimize multipath propagation.

Figure 8:
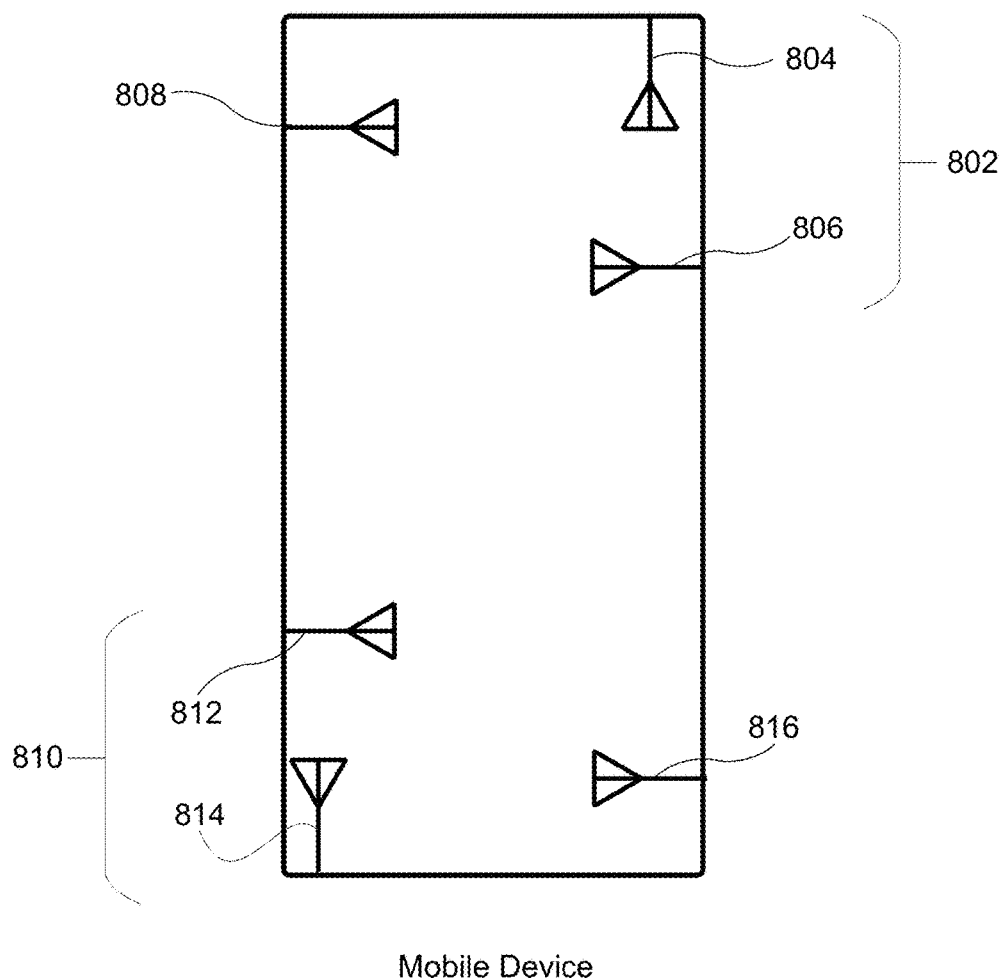
FIG. 8 illustrates a mobile device with multiple antenna arrays.

FIG. 8 illustrates a mobile device 800 with multiple antenna arrays. The mobile device 800 can include one or more antenna arrays (e.g., a first antenna array 802 and a second antenna array 810). The antenna arrays can include two or more antennas each (e.g., antennas 804, 806, 808). The antennas in the antenna array can be located in different positions and different orientations on the mobile device 800. The second antenna array 810 can include antennas 812, 814, and 816. The antennas can also be located on a different side of the mobile device (e.g., a front side, a backside, or one or more edges of the mobile device 800). The diverse antenna array allows the mobile device 800 to easily discriminate between direct and multipath signals.

Figure 9:
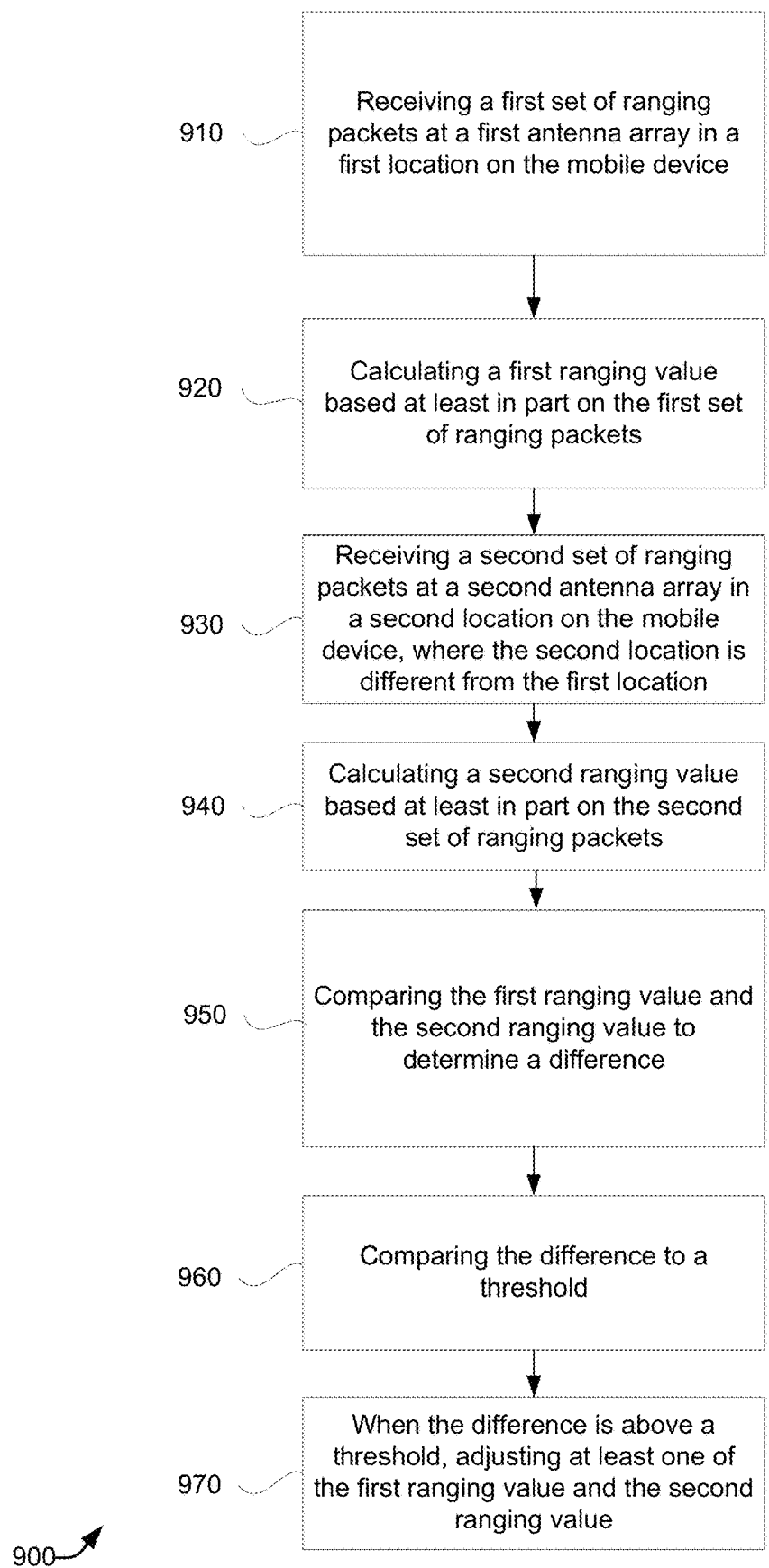
FIG. 9 illustrates an exemplary flowchart for a ranging technique using a mobile device with multiple antenna arrays.

FIG. 9 is a flow chart of an exemplary process 900 for techniques for improving ranging techniques between electronic devices. In some implementations, one or more process blocks of FIG. 9 can be performed by a mobile device. In some implementations, one or more process blocks of FIG. 9 can be performed by another device or a group of devices separate from or including the mobile device.

At 910, process 900 can include receiving a first set of ranging packets at a first antenna array in a first location on the mobile device. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can receive a first set of ranging packets at a first antenna array in a first location on the mobile device, as described above.

At 920, process 900 can include calculating a first ranging value based at least in part on the first set of ranging packets.

For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can calculate a first ranging value based at least in part on the first set of ranging packets, as described above.

At 930, process 900 can include receiving a second set of ranging packets at a second antenna array in a second location on the mobile device, where the second location is different from the first location. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can receive a second set of ranging packets at a second antenna array in a second location on the mobile device, as described above. In some implementations, the second location is different from the first location.

At 940, process 900 can include calculating a second ranging value based at least in part on the second set of ranging packets. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can calculate a second ranging value based at least in part on the second set of ranging packets, as described above.

At 950, process 900 can include comparing the first ranging value and the second ranging value to determine a difference. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can compare the first ranging value and the second ranging value to determine a difference, as described above.

At 960, process 900 can include comparing the difference to a threshold. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can compare the difference to a threshold, as described above.

At 970, process 900 can include, when the difference is above a threshold, adjusting at least one of the first ranging value and the second ranging value. For example, the mobile device (e.g., using processor 1118, computer readable medium 1102, wireless circuitry 1108, controller 1120, I/O subsystems 1106, applications 1134, operating system 1122, communication module 1124, ranging module 1128 and/or the like as illustrated in FIG. 11 and described below) can when the difference is above a threshold, adjust at least one of the first ranging value and the second ranging value, as described above.

Process 900 can include additional implementations, such as any single implementation or any combination of implementations described below and/or in connection with one or more other processes described elsewhere herein. It should be appreciated that the specific steps illustrated in FIG. 9 provide particular techniques for techniques for improving ranging techniques between electronic devices according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 9 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, a larger ranging value of the first ranging value and the second ranging value is adjusted.

In some implementations, the adjusting at least one of the first ranging value and the second ranging value comprises applying a weighting to a larger ranging value of the first ranging value and the second ranging value.

In some implementations, process 900 includes storing a plurality of values for the first ranging value and the second ranging value over time in a memory; detecting a change in one of the first ranging value or the second ranging value as compared with stored values; and when the change in one of the first ranging value or the second ranging value exceeds a threshold, adjusting at least one of the first ranging value and the second ranging value.

In some implementations, process 900 includes storing a plurality of sensor data from a visual, inertial, and optometry (VIO) sensor in a memory of the mobile device; analyzing the plurality of sensor data to determine an orientation of the mobile device; determining whether the first antenna array or the second antenna array is positioned to receive ranging signals based at least in part on the orientation of the mobile device.

In some implementations, process 900 includes calculating a weighted average of the first ranging value and the second ranging value.

In some implementations, process 900 includes displaying a historical value for a range if the difference exceeds a threshold.

In various embodiments, a mobile device can include one or more memories; and one or more processors in communication with the one or more memories and configured to execute instructions stored in the one or more memories to performing operations of a method described above.

In various embodiments, a computer-readable medium may store a plurality of instructions that, when executed by one or more processors of a computing device, cause the one or more processors to perform operations of any of the methods described above.

Although FIG. 9 shows example steps of process 900, in some implementations, process 900 can include additional steps, fewer steps, different steps, or differently arranged steps than those depicted in FIG. 9. Additionally, or alternatively, two or more of the steps of process 900 can be performed in parallel.

VI. Headerless/Dataless Mode for Enhanced Ranging Techniques

One of the challenges for finding electronic devices is precisely detecting lower power devices above background noise. The techniques disclosed herein can include a headerless/dataless mode to improve the detection of the electronic devices. Some wireless protocols produce stronger signals than others. For example, Bluetooth produces stronger signals than UWB. Federal regulations limit the transmission power of devices in certain frequency bands. Therefore due to these regulatory limits, it can be challenging to locate a wireless signal above background noise. In a headerless/dataless mode, the header information and data packet that is normally part of the UWB signal can be transmitted via the Bluetooth signal. By removing some data elements from the UWB signal, the UWB packet becomes shorter and thus easier to detect the time and frequency. In addition, the preamble and the secure training sequence (STS) can also be communicated over another wireless protocol (e.g., Bluetooth) to the electronic device to make identifying the UWB signal easier.

Each UWB packet can include a preamble (73 μsec), minimal framing and guard times (5 μsec), and an STS (67 μsec with 64 μsec usable). The preamble can include a ternary sequence with a few symbols. The preamble can be used to coarsely estimate a channel.

Security is often a requirement in message-exchange based ranging, e.g., to make sure signals (malicious or benign) from non-participating devices do not alter the time-of-arrival calculations at the corresponding receivers of the participating devices. One way to achieve this type of security is to make the UWB ranging packet difficult to fake (or "spoof") by an attacker. Protecting a ranging packet against spoofing can be done by including a cryptographically secure random sequence in the UWB ranging packet, which is known only to the ranging parties. In other implementations, the very low UWB transmit and receive signal powers require long correlators in order to accurately extract (or determine) time-of-arrival from a secure training sequence (STS). Long time correlation at the receiver can make an STS vulnerable to attack, even when the underlying bit sequence is cryptographically secure.

In an example using these techniques, an example packet format (or frame format) may include any or all of the following frame elements (or frame segments): a publicly known Preamble Sequence, e.g., a periodic sequence of pulses; a Start-of-Frame Delimiter (SFD) that marks the end of the Preamble; the Secure Training Sequence (STS) according to the above random pulse sequence with message encoding (message-encoded STS, or "ME-STS"), e.g., as discussed further below; and optionally, a PHY Header (PHR) and Data payload. The UWB HRP chapter per IEEE 802.15.4-2015 presents examples of how to generate Preambles, SFD, and PHR and Data Payload segments. Note that the STS may also be implemented after the Data payload, instead of between the SFD and the PHR. Furthermore, in some implementations, the PHR and Data payload may be omitted altogether.

The headerless/dataless mode can remove the SFD, PHR and Data payload. The preamble and the STS can also be communicated over another wireless protocol (e.g., Bluetooth). That information can be used to form a replica signal. The replica signal can be as short at 136 microseconds. Once the receiving device electronic device knows the replica signal, it can correlate directly against the incoming signal to learn the time and frequency of the received signal. This enables the receiving device to match exact patterns of incoming signals to reduce the integration time required to locate the peak of the incoming signal. The more data that the signal contains, the longer the integration time required to find the peak will be. Therefore, by using a headerless/dataless mode, it will become easier to find the peak of the incoming signal because the integration time can be reduced.

VII. Mobile Device for Enhanced Ranging Techniques

Figure 10:
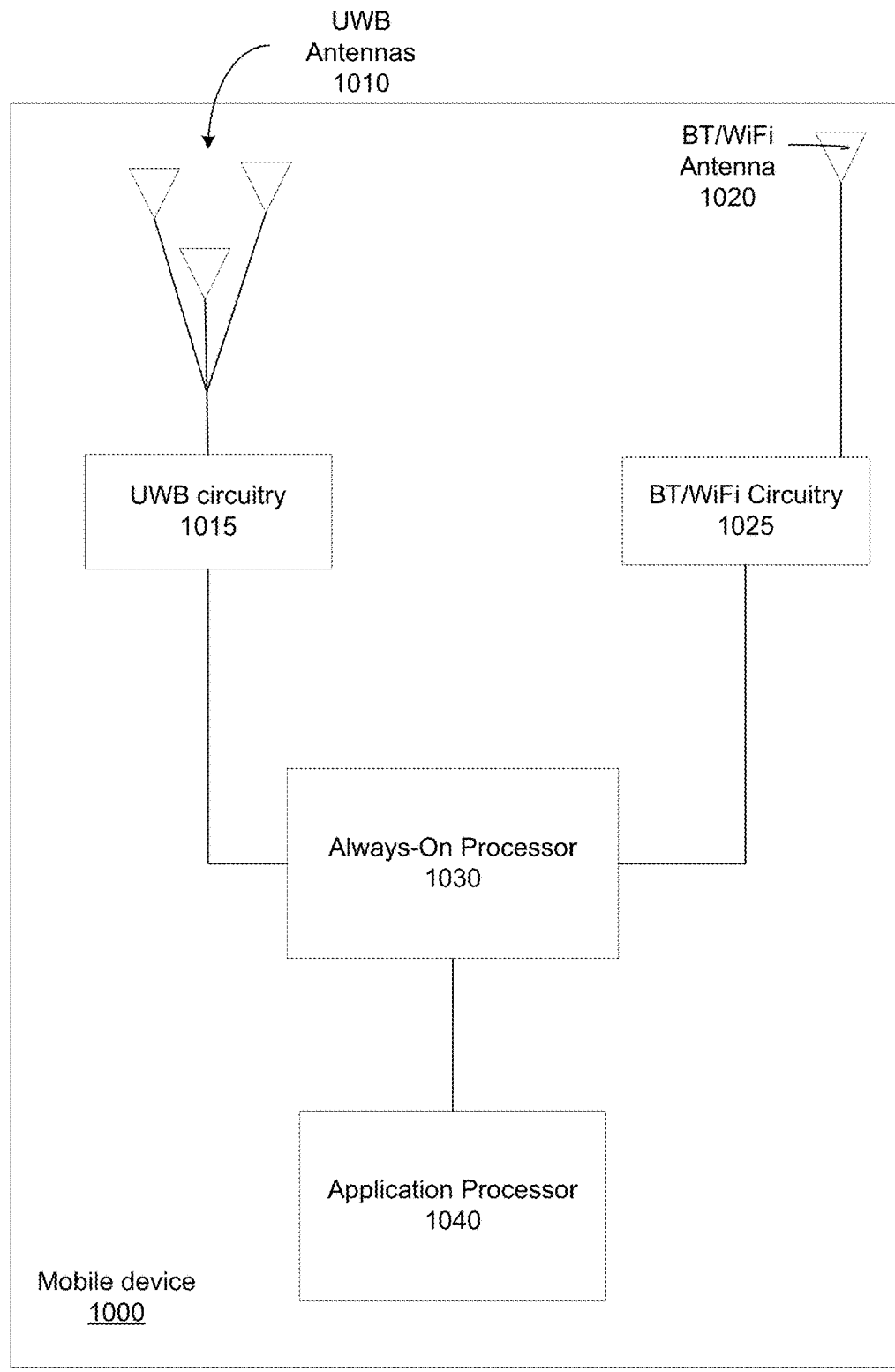
FIG. 10 is a block diagram of components of a mobile device operable to perform ranging according to embodiments of the present disclosure.

FIG. 10 is a block diagram of components of a mobile device 1000 operable to perform passive beacon communication techniques according to embodiments of the present disclosure. Mobile device 1000 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 1000 includes UWB antennas 1010 for performing ranging. UWB antennas 1010 are connected to UWB circuitry 1015 for analyzing detected signals from UWB antennas 1010. In some embodiments, mobile device 1000 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 1015 can communicate with an always-on processor (AOP) 1030, which can perform further processing using information from UWB messages. For example, AOP 1030 can perform the ranging calculations using timing data provided by UWB circuitry 1015. AOP 1030 and other circuits of the device can include dedicated circuitry and/or configurable circuitry, e.g., via firmware or other software.

As shown, mobile device 1000 also includes Bluetooth (BT)/Wi-Fi antenna 1020 for communicating data with other devices. Bluetooth (BT)/Wi-Fi antenna 1020 is connected to BT/Wi-Fi circuitry 1025 for analyzing detected signals from BT/Wi-Fi antenna 1020. For example, BT/Wi-Fi circuitry 1025 can parse messages to obtain data (e.g., an authentication tag), which can be sent on to AOP 1030. In some embodiments, AOP 1030 can perform authentication using an authentication tag. Thus, AOP 1030 can store or retrieve a list of authentication tags for which to compare a received tag against, as part of an authentication process. In some implementations, such functionality could be achieved by BT/Wi-Fi circuitry 1025.

In other embodiments, UWB circuitry 1015 and BT/Wi-Fi circuitry 1025 can alternatively or in addition be connected to application processor 1040, which can perform similar functionality as AOP 1030. Application processor 1040 typically requires more power than AOP 1030, and thus power can be saved by AOP 1030 handling certain functionality, so that application processor 1040 can remain in a sleep state, e.g., an off state. As an example, application processor 1040 can be used for communicating audio or video using BT/Wi-Fi, while AOP 1030 can coordinate transmission of such content and communication between UWB circuitry 1015 and BT/Wi-Fi circuitry 1025. For instance, AOP 1030 can coordinate timing of UWB messages relative to BT advertisements.

Coordination by AOP 1030 can have various benefits. For example, a first user of a sending device may want to share content with another user, and thus ranging may be desired with a receiving device of this other user. However, if many people are in the same room, the sending device may need to distinguish a particular device among the multiple devices in the room, and potentially determine which device the sending device is pointing to. Such functionality can be provided by AOP 1030. In addition, it is not desirable to wake up the application processor of every other device in the room, and thus the AOPs of the other devices can perform some processing of the messages and determine that the destination address is for a different device.

To perform ranging, BT/Wi-Fi circuitry 1025 can analyze an advertisement signal from another device to determine that the other device wants to perform ranging, e.g., as part of a process for sharing content. BT/Wi-Fi circuitry 1025 can communicate this notification to AOP 1030, which can schedule UWB circuitry 1015 to be ready to detect UWB messages from the other device.

For the device initiating ranging, its AOP can perform the ranging calculations. Further, the AOP can monitor changes in distance between the other devices. For example, AOP 1030 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

VIII. Example Mobile Device

FIG. 11 is a block diagram of an example mobile device 1100. The mobile device 1100 can include a smartphone, a wearable device (e.g., a smartwatch, smart glasses), a tablet computer, a laptop computer, or a desktop computer. The mobile device 1100 generally includes computer-readable medium 1102, control circuitry 1104, an Input/Output (I/O) subsystem 1106, wireless circuitry 1108, and audio circuitry 1110 including speaker 1150 and microphone 1152. These components may be coupled by one or more communication buses or signal lines 1103. Mobile device 1100 can be any portable electronic device, including a handheld computer, a tablet computer, a mobile phone, a laptop computer, a tablet device, a media player, a personal digital assistant (PDA), a key fob, a car key, an access card, a multifunction device, a mobile phone, a portable gaming device, a headset, or the like, including a combination of two or more of these items.

It should be apparent that the architecture shown in FIG. 11 is only one example of an architecture for mobile device 1100, and that mobile device 1100 can have more or fewer components than shown, or a different configuration of components. The various components shown in FIG. 11 can be implemented in hardware, software, or a combination of both hardware and software, including one or more signal processing and/or application-specific integrated circuits.

Wireless circuitry 1108 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1108 can use various protocols, e.g., as described herein. In various embodiments, wireless circuitry 1108 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1108 is coupled to control circuitry 1104 via peripherals interface 1116. Peripherals interface 1116 can include conventional components for establishing and maintaining communication between peripherals. Voice and data information received by wireless circuitry 1108 (e.g., in speech recognition or voice command applications) is sent to one or more processors 1118 via peripherals interface 1116. One or more processors 1118 are configurable to process various data formats for one or more application programs 1134 stored on computer-readable medium 1102.

Peripherals interface 1116 couple the input and output peripherals of mobile device 1100 to the one or more processors 1118 and computer-readable medium 1102. One or more processors 1118 communicate with computer-readable medium 1102 via a controller 1120. Computer-readable medium 1102 can be any device or medium that can store code and/or data for use by one or more processors 1118. Computer-readable medium 1102 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read Only Memory (ROM), FLASH, magnetic and/or optical storage devices, such as disk drives, magnetic tape, CDs (compact disks) and DVDs (digital video discs). In some embodiments, peripherals interface 1116, one or more processors 1118, and controller 1120 can be implemented on a single chip, such as control circuitry 1104. In some other embodiments, they can be implemented on separate chips.

Processors 1118 can include hardware and/or software elements that perform one or more processing functions, such as mathematical operations, logical operations, data manipulation operations, data transfer operations, controlling the reception of user input, controlling output of information to users, or the like. Processors 1118 can be embodied as one or more hardware processors, microprocessors, microcontrollers, field programmable gate arrays (FPGAs), application-specified integrated circuits (ASICs), or the like.

Mobile device 1100 may include storage and processing circuitry such as control circuitry 1104. Control circuitry 1104 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 1104 may be used to control the operation of mobile device 1100. This processing circuitry may be based on one or more microprocessors, microcontrollers, digital signal processors, baseband processor integrated circuits, application specific integrated circuits, etc.

Control circuitry 1104 may be used to run software on mobile device 1100, such as internet browsing applications, voice-over-internet-protocol (VOIP) telephone call applications, email applications, media playback applications, operating system functions, etc. To support interactions with external equipment, control circuitry 1104 may be used in implementing communications protocols. Communications protocols that may be implemented using control circuitry 1104 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Mobile device 1100 may include I/O subsystems 1106. I/O subsystems 1106 may include input-output devices. Input-output devices may be used to allow data to be supplied to mobile device 1100 and to allow data to be provided from mobile device 1100 to external devices. Input-output devices may include user interface devices, data port devices, and other input-output components. For example, input-output devices may include one or more displays (e.g., touch screens or displays without touch sensor capabilities), one or more image sensors 1144 (e.g., digital image sensors), motion sensors, and speakers 1150. Input-output devices may also include buttons, joysticks, scrolling wheels, touch pads, key pads, keyboards, microphones 1152, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Mobile device 1100 also includes a power system 1142 for powering the various hardware components. Power system 1142 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 1100 includes an image sensor 1144 (e.g., a camera). In some embodiments, mobile device 1100 includes sensors 1146. Sensors can include accelerometers, compass, gyrometer, pressure sensors, audio sensors, light sensors, barometers, and the like. Sensors 1146 can be used to sense location aspects, such as auditory or light signatures of a location.

In some embodiments, mobile device 1100 can include a GPS receiver, sometimes referred to as a GPS unit 1148. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1118 run various software components stored in computer-readable medium 1102 to perform various functions for mobile device 1100. In some embodiments, the software components include an operating system 1122, a communication module 1124 (or set of instructions), a location/motion module 1126 (or set of instructions), a ranging module 1128 that is used as part of ranging operation described herein, and other application programs 1134 (or set of instructions).

Operating system 1122 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1124 facilitates communication with other devices over one or more external ports 1136 or via wireless circuitry 1108 and includes various software components for handling data received from wireless circuitry 1108 and/or external port 1136. External port 1136 (e.g., universal serial bus (USB), FireWire, Lightning connector, 60-pin connector, etc.) is adapted for coupling directly to other devices or indirectly over a network (e.g., the Internet, wireless LAN, etc.).

Location/motion module 1126 can assist in determining the current position (e.g., coordinates or other geographic location identifiers) and motion of mobile device 1100. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1126 receives data from GPS unit 1148 and analyzes the signals to determine the current position of the mobile device. In some embodiments, location/motion module 1126 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1108 and is passed to location/motion module 1126. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for mobile device 1100 based on the position coordinates of the corresponding transmitters. Regardless of the specific location technology used, location/motion module 1126 receives information from which a location fix can be derived, interprets that information, and returns location information, such as geographic coordinates, latitude/longitude, or other location fix data, Ranging module 1128 can send/receive ranging messages to/from an antenna, e.g., connected to wireless circuitry 1108. The messages can be used for various purposes, e.g., to identify a sending antenna of a device, determine timestamps of messages to determine a distance of mobile device 1100 from another device. Ranging module 1128 can exist on various processors of the device, e.g., an always-on processor (AOP), a UWB chip, and/or an application processor. For example, parts of ranging module 1128 can determine a distance on an AOP, and another part of the ranging module can interact with a sharing module, e.g., to display a position of the other device on a screen in order for a user to select the other device to share a data item. Ranging module 1128 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of mobile device 1100 (e.g., portions of the display cover layer, portions of a plastic antenna window in a metal housing sidewall portion of housing, etc.). With one illustrative configuration, some or all of the rear face of mobile device 1100 may be formed from a dielectric. For example, the rear wall of housing may be formed from glass plastic, ceramic, other dielectric. In this type of arrangement, antennas may be mounted within the interior of mobile device 1100 in a location that allows the antennas to transmit and receive antenna signals through the rear wall of mobile device 1100 (and, if desired, through optional dielectric sidewall portions in housing). Antennas may also be formed from metal sidewall structures in housing and may be located in peripheral portions of mobile device 1100.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas are being adversely affected due to the orientation of housing, blockage by a user's hand or other external object, or other environmental factors. Mobile device 1100 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of mobile device 1100 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in mobile device 1100. As an example, antennas may be mounted at one or both ends of mobile device 1100 (e.g., along the upper and lower edges of housing, at the corners of housing, etc.).

Antennas in mobile device 1100 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in mobile device 1100 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 1144 may include one or more visible digital image sensors (visible-light cameras) and/or one or more infrared digital image sensors (infrared-light cameras). Image sensors 1144 may, if desired, be used to measure distances. For example, an infrared time-of-flight image sensor may be used to measure the time that it takes for an infrared light pulse to reflect back from objects in the vicinity of mobile device 1100, which may in turn be used to determine the distance to those objects. Visible imaging systems such as a front and/or rear-facing camera in mobile device 1100 may also be used to determine the position of objects in the environment. For example, control circuitry 1104 may use image sensors 1144 to perform simultaneous localization and mapping (SLAM). SLAM refers to the process of using images to determine the position of objects in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 1104 may rely entirely upon image sensors 1144 to perform simultaneous localization and mapping, or control circuitry 1104 may synthesize image data with range data from one or more distance sensors (e.g., light-based proximity sensors). If desired, control circuitry 1104 may use a display to display a visual representation of the mapped environment.

Input-output devices may include motion sensor circuitry 1146. Motion sensor circuitry 1146 may include one or more accelerometers (e.g., accelerometers that measure acceleration along one, two, or three axes), gyroscopes, barometers, magnetic sensors (e.g., compasses), image sensors (e.g., image sensor 1144) and other sensor structures. Sensors 1146 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 1104 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 1104. Movement generation circuitry may include electromechanical actuator circuitry that, when driven, moves mobile device 1100 in one or more directions. For example, movement generation circuitry may laterally move mobile device 1100 and/or may rotate mobile device 1100 around one or more axes of rotation. Movement generation circuitry may, for example, include one or more actuators formed at one or more locations of mobile device 1100. When driven by a motion control signal, actuators may move (e.g., vibrate, pulse, tilt, push, pull, rotate, etc.) to cause mobile device 1100 to move or rotate in one or more directions. The movement may be slight (e.g., not noticeable or barely noticeable to a user of mobile device 1100), or the movement may be substantial. Actuators may be based on one or more vibrators, motors, solenoids, piezoelectric actuators, speaker coils, or any other desired device capable of mechanically (physically) moving mobile device 1100.

Some or all of movement generation circuitry such as actuators may be used to perform operations that are unrelated to rotation of mobile device 1100. For example, actuators may include vibrators that are actuated to issue a haptic alert or notification to a user of mobile device 1100. Such alerts may include, for example, a received text message alert identifying that mobile device 1100 has received a text message, a received telephone call alert, a received email alert, an alarm notification alert, a calendar notification alert, or any other desired notification. By actuating actuator, mobile device 1100 may inform the user of any desired device condition.

Motion sensor circuitry may sense motion of mobile device 1100 that is generated by movement generation circuitry. If desired, motion sensor circuitry may provide feedback signals associated with the sensed motion of mobile device 1100 to movement generation circuitry. Movement generation circuitry may use the feedback signals to control actuation of the movement generation circuitry.

Control circuitry 1104 may use motion sensor circuitry and/or movement generation circuitry to determine the angle of arrival of wireless signals received by mobile device 1100 from another electronic device. For example, control circuitry 1104 may use movement generation circuitry to move mobile device 1100 from one position to another. Motion sensor circuitry may be used to track the movement of mobile device 1100 as it is moved between the different positions. At each position, control circuitry 1104 may receive wireless signals from another electronic device. Control circuitry 1104 may process the received wireless signals together with the motion data from motion sensor circuitry to more accurately determine the position of the other electronic device. The use of motion generation circuitry is merely illustrative, however. If desired, motion sensor circuitry may track movement of mobile device 1100 that is not caused by motion generation circuitry. This may include a user's natural, unprompted movement of mobile device 1100 and/or the user's movement of mobile device 1100 after the user is prompted (by display, audio circuitry 1110, a haptic output device in mobile device 1100, or any other suitable output device) to move mobile device 1100 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 1108 may include radio-frequency transceiver circuitry for handling various radio-frequency communications bands. For example, wireless circuitry 1108 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for a receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of mobile device 1100 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 1134 on mobile device 1100 can include any applications installed on the mobile device 1100, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1106 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode) technology, LCD (liquid crystal display) technology, or LPD (light emitting polymer display) technology, although other display technologies can be used in other embodiments.

In some embodiments, I/O subsystem 1106 can include a display and user input devices such as a keyboard, mouse, and/or trackpad. In some embodiments, I/O subsystem 1106 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1102) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1106 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, mobile device 1100 can include a touchpad (not shown) for activating or deactivating particular functions. In some embodiments, the touchpad is a touch-sensitive area of the mobile device 1100 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

IX. Example Electronic Device

Figure 12:
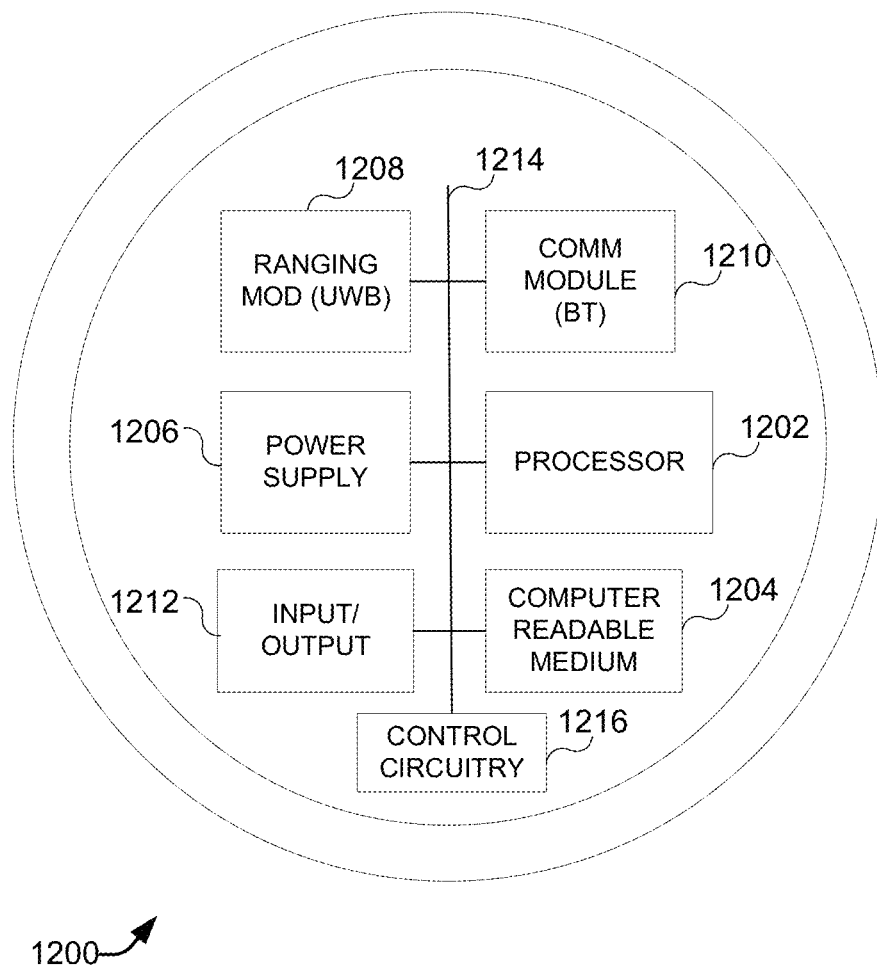
FIG. 12 is a block diagram of an example electronic device according to embodiments of the present disclosure.

FIG. 12 is a block diagram of an example electronic device 1200. Device 1200 generally includes a processor 1202, a computer-readable medium 1204, a power system 1206, a ranging module 1208, a communication module (e.g., Bluetooth), and I/O subsystem 1212. These components may be coupled by one or more communication buses or signal lines 1214. Device 1200 can be any electronic device, including a handheld computer, a tablet computer, a mobile phone, a laptop computer, a tablet device, a media player, personal digital assistant (PDA), a key fob, a car key, an electronic tag, an access card, a multifunction device, a mobile phone, a portable gaming device, a headset, or the like, including a combination of two or more of these items.

It should be apparent that the architecture shown in FIG. 12 is only one example of an architecture for device 1200, and that device 1200 can have more or fewer components than shown, or a different configuration of components. The various components shown in FIG. 12 can be implemented in hardware, software, or a combination of both hardware and software, including one or more signal processing and/or application specific integrated circuits. Although the electronic device 1200 is depicted as being round in shape it is not so limited.

A communication module 1210 can include wireless circuitry that can be used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry can use various protocols, e.g., as described herein. In various embodiments, wireless circuitry is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

One or more processors 1202 communicate with computer-readable medium 1204. Computer-readable medium 1204 can be any device or medium that can store code and/or data for use by one or more processors 1202. Computer-readable medium 1204 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs)).

Processor(s) 1202 can include hardware and/or software elements that perform one or more processing functions, such as mathematical operations, logical operations, data manipulation operations, data transfer operations, controlling the reception of user input, controlling output of information to users, or the like. Processor(s) 1202 can be embodied as one or more hardware processors, microprocessors, microcontrollers; field programmable gate arrays (FPGAs), application-specified integrated circuits (ASICs), or the like.

Device 1200 may include storage and processing circuitry such as control circuitry 1216. Control circuitry 1216 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 1216 may be used to control the operation of device 1200. This processing circuitry may be based on one or more microprocessors, microcontrollers, digital signal processors, baseband processor integrated circuits, application specific integrated circuits, etc.

Control circuitry 1216 may be used to run software on device 1200, such as internet browsing applications, voice-over-internet-protocol (VOIP) telephone call applications, email applications, media playback applications, operating system functions, etc. To support interactions with external equipment, control circuitry 1216 may be used in implementing communications protocols. Communications protocols that may be implemented using control circuitry 1216 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 1200 may include I/O subsystem 1212. I/O subsystem 1212 may include input-output devices. Input-output devices may be used to allow data to be supplied to device 1200 and to allow data to be provided from device 1200 to external devices. Input-output devices may include user interface devices, data port devices, and other input-output components. For example, input-output devices may include one or more displays (e.g., touch screens or displays without touch sensor capabilities), one or more image sensors (e.g., digital image sensors), motion sensors, and speakers. Input-output device may also include buttons, joysticks, scrolling wheels, touch pads, key pads, keyboards, microphones, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 1200 also includes a power system 1206 for powering the various hardware components. Power system 1206 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1200 includes an image sensor (e.g., a camera). In some embodiments, device 1200 includes sensors. Sensors can include accelerometers, compass, gyrometer, pressure sensors, audio sensors, light sensors, barometers, and the like. Sensors can be used to sense location aspects, such as auditory or light signatures of a location.

In some embodiments, device 1200 can include a GPS receiver, sometimes referred to as a GPS unit. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1202 run various software components stored in computer-readable medium 1204 to perform various functions for device 1200. In some embodiments, the software components include an operating system, a communication module 1210 (or set of instructions), a location module (or set of instructions), a ranging module 1208 that is used as part of ranging operation described herein, and other application programs (or set of instructions).

The operating system can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1210 facilitates communication with other devices over one or more external ports or via wireless circuitry and includes various software components for handling data received from wireless circuitry and/or external port. The external port (e.g., universal serial bus (USB), FireWire, Lightning connector, 60-pin connector, etc.) is adapted for coupling directly to other devices or indirectly over a network (e.g., the Internet, wireless LAN, etc.).

Location/motion module can assist in determining the current position (e.g., coordinates or other geographic location identifiers) and motion of device 1200. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module receives data from GPS unit 1248 and analyzes the signals to determine the current position of the mobile device. In some embodiments, location/motion module can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry and is passed to location/motion module. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1200 based on the position coordinates of the corresponding transmitters. Regardless of the specific location technology used, location/motion module receives information from which a location fix can be derived, interprets that information, and returns location information, such as geographic coordinates, latitude/longitude, or other location fix data Ranging module 1208 can send/receive ranging messages to/from an antenna, e.g., connected to wireless circuitry. The messages can be used for various purposes, e.g., to identify a sending antenna of a device, determine timestamps of messages to determine a distance of mobile device 1200 from another device. Ranging module 1208 can exist on various processors of the device, e.g., an always-on processor (AOP), a UWB chip, and/or an application processor. For example, parts of ranging module 1208 can determine a distance on an AOP, and another part of the ranging module can interact with a sharing module, e.g., to display a position of the other device on a screen in order for a user to select the other device to share a data item. Ranging module 1208 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 1200 (e.g., portions of the display cover layer, portions of a plastic antenna window in a metal housing sidewall portion of housing, etc.). With one illustrative configuration, some or all of the rear face of device 1200 may be formed from a dielectric. For example, the rear wall of housing may be formed from glass plastic, ceramic, other dielectric. In this type of arrangement, antennas may be mounted within the interior of device 1200 in a location that allows the antennas to transmit and receive antenna signals through the rear wall of device 1200 (and, if desired, through optional dielectric sidewall portions in housing). Antennas may also be formed from metal sidewall structures in housing and may be located in peripheral portions of device 1200.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas are being adversely affected due to the orientation of housing, blockage by a user's hand or other external object, or other environmental factors. Device 1200 can then switch one or more replacement antennas into use in place of the antennas that are being adversely affected.

Antennas may be mounted at the corners of housing, along the peripheral edges of housing, on the rear of housing, under the display cover layer that is used in covering and protecting the display on the front of device 1200 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 1200. As an example, antennas may be mounted at one or both ends of device 1200 (e.g., along the upper and lower edges of housing, at the corners of housing, etc.).

Antennas in device 1200 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 1200 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors may include one or more visible digital image sensors (visible-light cameras) and/or one or more infrared digital image sensors (infrared-light cameras). Image sensors may, if desired, be used to measure distances. For example, an infrared time-of-flight image sensor may be used to measure the time that it takes for an infrared light pulse to reflect back from objects in the vicinity of device 1200, which may in turn be used to determine the distance to those objects. Visible imaging systems such as a front and/or rear-facing camera in device 1200 may also be used to determine the position of objects in the environment. For example, control circuitry may use image sensors to perform simultaneous localization and mapping (SLAM). SLAM refers to the process of using images to determine the position of objects in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 1216 may rely entirely upon image sensors to perform simultaneous localization and mapping, or control circuitry 1216 may synthesize image data with range data from one or more distance sensors (e.g., light-based proximity sensors). If desired, control circuitry 1216 may use the display to display a visual representation of the mapped environment.

Input-output devices may include motion sensor circuitry. Motion sensor circuitry may include one or more accelerometers (e.g., accelerometers that measure acceleration along one, two, or three axes), gyroscopes, barometers, magnetic sensors (e.g., compasses), image sensors (e.g., image sensor) and other sensor structures. Sensors may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 1216 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 1216. Movement generation circuitry may include electromechanical actuator circuitry that, when driven, moves device 1200 in one or more directions. For example, movement generation circuitry may laterally move device 1200 and/or may rotate device 1200 around one or more axes of rotation. Movement generation circuitry may, for example, include one or more actuators formed at one or more locations of device 1200. When driven by a motion control signal, actuators may move (e.g., vibrate, pulse, tilt, push, pull, rotate, etc.) to cause device 1200 to move or rotate in one or more directions. The movement may be slight (e.g., not noticeable or barely noticeable to a user of device 1200), or the movement may be substantial. Actuators may be based on one or more vibrators, motors, solenoids, piezoelectric actuators, speaker coils, or any other desired device capable of mechanically (physically) moving device 1200.

Some or all of movement generation circuitry such as actuators may be used to perform operations that are unrelated to rotation of device 1200. For example, actuators may include vibrators that are actuated to issue a haptic alert or notification to a user of device 1200. Such alerts may include, for example, a received text message alert identifying that device 1200 has received a text message, a received telephone call alert, a received email alert, an alarm notification alert, a calendar notification alert, or any other desired notification. By actuating the actuator, device 1200 may inform the user of any desired device condition.

Motion sensor circuitry may sense motion of device 1200 that is generated by movement generation circuitry. If desired, motion sensor circuitry may provide feedback signals associated with the sensed motion of device 1200 to movement generation circuitry. Movement generation circuitry may use the feedback signals to control actuation of the movement generation circuitry.

Control circuitry 1216 may use motion sensor circuitry and/or movement generation circuitry to determine the angle of arrival of wireless signals received by device 1200 from another electronic device. For example, control circuitry 1216 may use movement generation circuitry to move device 1200 from one position to another. Motion sensor circuitry may be used to track the movement of device 1200 as it is moved between the different positions. At each position, control circuitry 1216 may receive wireless signals from another electronic device. Control circuitry 1216 may process the received wireless signals together with the motion data from motion sensor circuitry to more accurately determine the position of the other electronic device. The use of motion generation circuitry is merely illustrative, however. If desired, motion sensor circuitry may track movement of device 1200 that is not caused by motion generation circuitry. This may include a user's natural, unprompted movement of device 1200 and/or the user's movement of device 1200 after the user is prompted (by display, audio circuitry, a haptic output device in device 1200, or any other suitable output device) to move device 1200 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Communications module 1210 may include radio-frequency transceiver circuitry for handling various radio-frequency communications bands. For example, communication module 1210 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for a receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 1200 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications on device 1200 can include any applications installed on the device 1200, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1212 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1212 can include a display and user input devices such as a keyboard, mouse, and/or trackpad. In some embodiments, I/O subsystem 1212 can include a touch-sensitive display. A touch-sensitive display can also accept input from the user based at least in part on haptic and/or tactile contact. In some embodiments, a touch-sensitive display forms a touch-sensitive surface that accepts user input. The touch-sensitive display/surface (along with any associated modules and/or sets of instructions in computer-readable medium) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1212 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1200 can include a touchpad (not shown) for activating or deactivating particular functions. In some embodiments, the touchpad is a touch-sensitive area of the device 1200 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

As described above, one aspect of the present technology is the gathering, sharing, and use of data, including an authentication tag and data from which the tag is derived. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which device ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, users may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or," unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of ranging via a wireless protocol with an electronic device by a mobile device, the method performed by the mobile device comprising:
    obtaining a first set of time measurements for signals sent and received by the mobile device for a ranging session between the mobile device and the electronic device;
    obtaining a second set of time measurements for signals sent and received by the electronic device for the ranging session;
    calculating a frequency offset between a first oscillator of the mobile device and a second oscillator of the electronic device using the first set of time measurements and the second set of time measurements;
    comparing an observed frequency offset to the calculated frequency offset to determine a frequency offset difference; and
    when the frequency offset difference exceeds a threshold, adjusting a ranging measurement.

2. The method of claim 1, wherein the observed frequency offset is determined from a measured signal of the wireless protocol of the electronic device.

3. The method of claim 1, further comprising calculating a range between the electronic device and the mobile device using the first set of time measurements and the second set of time measurements.

4. The method of claim 1, wherein obtaining the first set of time measurements includes:
    receiving, via the wireless protocol, an information packet comprising a first timestamp from the electronic device in a first ranging packet, the first timestamp indicating a first transmission time of the first ranging packet; and
    calculating a second timestamp indicating a second transmission time for the mobile device to transmit a response packet to the first ranging packet,
    wherein the method further comprises:
        sending, via the wireless protocol, the calculated second timestamp to the electronic device.

5. The method of claim 1, wherein the adjusting the ranging measurement comprises applying a weighting to the ranging measurement based at least on the frequency offset difference.

6. The method of claim 1, further comprising displaying a previously calculated ranging based at least on the frequency offset difference.

7. The method of claim 1, further comprising calculating a direction to the electronic device based at least in part on received data packets.

8. A mobile device configured to perform ranging via a wireless protocol with an electronic device, the mobile device comprising:

a memory comprising computer-executable instructions; and one or more processors in communication with the memory and configured to access the memory and execute the computer-executable instructions to perform operations comprising:
obtaining a first set of time measurements for signals sent and received by the mobile device for a ranging session between the mobile device and the electronic device;
obtaining a second set of time measurements for signals sent and received by the electronic device for the ranging session;
calculating a frequency offset between a first oscillator of the mobile device and a second oscillator of the electronic device using the first set of time measurements and the second set of time measurements;
comparing an observed frequency offset to the calculated frequency offset to determine a frequency offset difference; and
when the frequency offset difference exceeds a threshold, adjusting a ranging measurement.

9. The mobile device of claim 8, wherein the observed frequency offset is determined from a measured signal of the wireless protocol of the electronic device.

10. The mobile device of claim 8, wherein the operations further comprise calculating a range between the electronic device and the mobile device using the first set of time measurements and the second set of time measurements.

11. The mobile device of claim 8, wherein obtaining the first set of time measurements includes:
receiving, via the wireless protocol, an information packet comprising a first timestamp from the electronic device in a first ranging packet, the first timestamp indicating a first transmission time of the first ranging packet; and
calculating a second timestamp indicating a second transmission time for the mobile device to transmit a response packet to the first ranging packet,
wherein the operations further comprise:
sending, via the wireless protocol, the calculated second timestamp to the electronic device.

12. The mobile device of claim 8, wherein the adjusting the ranging measurement comprises applying a weighting to the ranging measurement based at least on the frequency offset difference.

13. The mobile device of claim 8, wherein the operations further comprise displaying a previously calculated ranging based at least on the frequency offset difference.

14. The mobile device of claim 8, wherein the operations further comprise calculating a direction to the electronic device based at least in part on received data packets.

15. One or more non-transitory computer-readable storage mediums comprising computer-executable instructions that, when executed by one or more processors, cause the one or more processors of a mobile device to perform operations to perform ranging via a wireless protocol with an electronic device, the operations comprising:
obtaining a first set of time measurements for signals sent and received by the mobile device for a ranging session between the mobile device and the electronic device;
obtaining a second set of time measurements for signals sent and received by the electronic device for the ranging session;
calculating a frequency offset between a first oscillator of the mobile device and a second oscillator of the electronic device using the first set of time measurements and the second set of time measurements;
comparing an observed frequency offset to the calculated frequency offset to determine a frequency offset difference; and
when the frequency offset difference exceeds a threshold, adjusting a ranging measurement.

16. The one or more non-transitory computer-readable storage mediums of claim 15, wherein the observed frequency offset is determined from a measured signal of the wireless protocol of the electronic device.

17. The one or more non-transitory computer-readable storage mediums of claim 15, wherein the operations further comprise calculating a range between the electronic device and the mobile device using the first set of time measurements and the second set of time measurements.

18. The one or more non-transitory computer-readable storage mediums of claim 15, wherein obtaining the first set of time measurements includes:
receiving, via the wireless protocol, an information packet comprising a first timestamp from the electronic device in a first ranging packet, the first timestamp indicating a first transmission time of the first ranging packet; and
calculating a second timestamp indicating a second transmission time for the mobile device to transmit a response packet to the first ranging packet,
wherein the operations of claim 1 further comprise:
sending, via the wireless protocol, the calculated second timestamp to the electronic device.

19. The one or more non-transitory computer-readable storage mediums of claim 15, wherein the adjusting the ranging measurement comprises applying a weighting to the ranging measurement based at least on the frequency offset difference.

20. The one or more non-transitory computer-readable storage mediums of claim 15, wherein the operations further comprise displaying a previously calculated ranging based at least on the frequency offset difference.

* * * * *